(12) United States Patent
Kawahara

(10) Patent No.: US 7,830,445 B2
(45) Date of Patent: Nov. 9, 2010

(54) IMAGE-PICKUP APPARATUS AND FOCUS CONTROL METHOD FOR THE SAME

(75) Inventor: Hideo Kawahara, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 11/775,521

(22) Filed: Jul. 10, 2007

(65) Prior Publication Data
US 2008/0024651 A1 Jan. 31, 2008

(30) Foreign Application Priority Data

| Jul. 25, 2006 | (JP) | ............................ 2006-201999 |
| Aug. 17, 2006 | (JP) | ............................ 2006-222209 |
| Aug. 17, 2006 | (JP) | ............................ 2006-222210 |

(51) Int. Cl.
*H04N 5/232* (2006.01)
*G03B 13/00* (2006.01)

(52) U.S. Cl. .................. 348/345; 348/348; 348/353; 348/349; 348/350; 396/125

(58) Field of Classification Search ............... 348/345, 348/348, 353, 349; 396/125
See application file for complete search history.

(56) References Cited

U.S. PATENT DOCUMENTS

| 5,534,965 A * | 7/1996 | Higaki et al. ................ 396/48 |
| 7,499,097 B2 | 3/2009 | Onozawa |
| 2005/0088538 A1* | 4/2005 | Nozaki et al. ............ 348/229.1 |
| 2005/0185086 A1 | 8/2005 | Onozawa |
| 2006/0072032 A1* | 4/2006 | Kaneda ...................... 348/362 |
| 2006/0109370 A1* | 5/2006 | Yamazaki ................... 348/345 |

FOREIGN PATENT DOCUMENTS

CN 1661458 A 8/2005

OTHER PUBLICATIONS

The above references were cited in a Feb. 27, 2009 Chinese Office Action that issued in Chinese Patent Application No. 200710129772.5, which is enclosed with English Translation.

* cited by examiner

*Primary Examiner*—David L Ometz
*Assistant Examiner*—Quang V Le
(74) *Attorney, Agent, or Firm*—Cowan, Liebowitz & Latman, P.C.

(57) ABSTRACT

An image-pickup apparatus is disclosed which can prevent focus control from being performed on the basis of incorrect information on an object distance externally measured. The image-pickup apparatus includes a first detector which produces first information corresponding to a contrast state of a picked-up image, a second detector which receives light from an object to detect second information corresponding to a distance to the object, and a controller which performs focus control by using the first information and the second information. The controller performs the focus control by using the first information without using the second information when a light-receiving luminance level in the second detector is lower than a first value.

2 Claims, 22 Drawing Sheets

IMAGE-PICKUP APPARATUS AND FOCUS CONTROL METHOD FOR THE SAME

BACKGROUND OF THE INVENTION

The present invention relates to an image-pickup apparatus such as a video camera and a digital still camera, and more particularly, to focus control in such an image-pickup apparatus.

In autofocus (AF) control for image-pickup apparatuses such as video cameras, a TV-AF method is primarily used which includes using an image-pickup element to produce a video signal, producing an AF evaluation value signal corresponding to the sharpness (contrast state) of the video signal (picked-up image), and searching for the position of a focus lens where the AF evaluation value signal is at the maximum.

Another AF method is an external ranging method (external phase difference detection method) in which a ranging (distance-measuring) sensor is provided independently of an image-pickup lens to detect the distance from an object, an in-focus position of a focus lens is calculated on the basis of the detected distance, and the focus lens is moved to the in-focus position.

The external ranging method involves splitting a luminous flux from an object into two which in turn are received by a pair of light-receiving element arrays (line sensors). A difference between the images formed on the pair of line sensors, that is, a phase difference, is detected and used to determine the object distance with triangulation, and the focus lens is moved to the in-focus position for that object distance.

To take advantage of the high accuracy of focusing in the TV-AF method and the fast focusing in the external ranging method, a hybrid AF method has been developed by combining these AF methods and disclosed in Japanese Patent Laid-Open No. 2005-84426, for example. In the hybrid AF method disclosed in Japanese Patent Laid-Open No. 2005-84426, focusing is obtained with the phase difference detection method when it is determined that the TV-AF method cannot achieve the focusing due to low luminance or low contrast of an object.

Japanese Patent Laid-Open No. 5(1993)-64056 has disclosed another hybrid AF method in which a focus lens is driven to near an in-focus position in a TTL phase difference detection method and then the focus lens is driven with higher accuracy to the in-focus position in the TV-AF method. Japanese Patent Laid-Open No. 2005-234325 has disclosed another hybrid AF method in which either the TV-AF method or the external ranging phase difference detection method is selected in performing focus control based on the amounts of change of signals produced in the two methods.

In the hybrid AF using the TV-AF method and the external ranging method in combination, correct information on an object distance cannot be provided if an obstruction which is not an object is present between a ranging sensor and the object. The ranging sensor is typically placed close to an image-pickup lens to minimize parallax between an image-pickup field for picking up images through the image-pickup lens and a view field for detection (detection view field) in the ranging sensor. In this case, a hand of a user, for example, is often put between the ranging sensor and an object to block an entrance of light from the object on the ranging sensor. The blocking of the light from the object to the ranging sensor leads to a longer time taken to achieve focusing or an inability to achieve focusing, so that it is impossible to make the most of the advantage of the fast focusing which results from the external ranging method used in combination with the TV-AF method.

To solve the problem, Japanese Patent Laid-Open No. 2005-241805 has disclosed an image-pickup apparatus in which focus control is performed with the TV-AF method instead of the external ranging method when a pair of light-receiving element arrays in a ranging sensor provide outputs which differ by a threshold amount or more.

The method disclosed in Japanese Patent Laid-Open No. 2005-241805 is effective when only one of the paired light-receiving element arrays in the ranging sensor is covered with an obstruction such as a hand of a user. However, if both of the paired light-receiving element arrays are covered similarly with the hand of the user, for example, the difference between the outputs from the pair of light-receiving element arrays is smaller than the threshold and thus focus control may be performed with the external ranging method. In other words, the focus control may be performed on the basis of the incorrect object distance information, thereby resulting in a longer time taken to obtain an in-focus state or an inability to obtain the in-focus state.

BRIEF SUMMARY OF THE INVENTION

The present invention provides an image-pickup apparatus which can prevent focus control from being performed on the basis of incorrect information on an object distance externally measured, and a focus control method for the image-pickup apparatus.

According to an aspect, the present invention provides an image-pickup apparatus including a first detector which produces first information corresponding to a contrast state of a picked-up image, a second detector which receives light from an object to detect second information corresponding to a distance to the object, and a controller which performs focus control by using the first information and the second information. The controller performs the focus control by using the first information without using the second information when a light-receiving luminance level in the second detector is lower than a first value.

According to another aspect, the present invention provides an image-pickup apparatus including a first detector which produces first information corresponding to a contrast state of a picked-up image, a second detector which includes at least a pair of light-receiving element arrays, each of which includes a plurality of light-receiving elements, and calculates a correlation value of signals output from the light-receiving element arrays receiving light from an object to detect second information corresponding to a distance to the object, and a controller which performs focus control by using the first information and the second information. The controller performs the focus control by using the first information without using the second information when the correlation value is lower than a first value.

According to yet another aspect, the present invention provides an image-pickup apparatus including a first detector which produces first information corresponding to a contrast state of a picked-up image, a second detector which receives light from an object to detect second information corresponding to a distance to the object, and a controller which performs focus control by using the first information and the second information. The controller performs the focus control by using the first information without using the second information when the distance corresponding to the second information is shorter than a first distance.

According to still another aspect, the present invention provides a focus control method for an image-pickup apparatus which includes a step of acquiring first information corresponding to a contrast state of a picked-up image, a step of acquiring second information corresponding to a distance to an object by using a detector which receives light from the object, and a control step of performing focus control by using the first information and the second information. The control step includes performing the focus control by using the first information without using the second information when a light-receiving luminance level in the detector is lower than a first value.

According to a further aspect, the present invention provides a focus control method for an image-pickup apparatus which includes a step of acquiring first information corresponding to a contrast state of a picked-up image, a step of acquiring second information corresponding to a distance to an object by calculating a correlation value of signals output from at least a pair of light-receiving element arrays receiving light from the object, each of which includes a plurality of light-receiving elements, and a control step of performing focus control by using the first information and the second information. The control step includes performing the focus control by using the first information without using the second information when the correlation value is lower than a first value.

According to a yet further aspect, the present invention provides a focus control method for an image-pickup apparatus which includes a step of acquiring first information corresponding to a contrast state of a picked-up image, a step of acquiring second information corresponding to a distance to an object by using a detector which receives light from the object, and a control step of performing focus control by using the first information and the second information. The control step includes performing the focus control by using the first information without using the second information when the distance corresponding to the second information is shorter than a first distance.

According to a still further aspect, the present invention provides an image-pickup apparatus including a first detector which produces first information corresponding to a contrast state of a picked-up image produced by using an image-pickup element, a second detector which receives light from an object to detect second information corresponding to a distance to the object, a focus controller which performs focus control by using the first information and the second information, and an aperture controller which controls an aperture stop for adjusting an amount of light entering the image-pickup element. The focus controller performs the focus control by using the first information without using the second information when information on a light-receiving state of the second detector is not changed in accordance with a change in a control state of the aperture stop with the aperture controller.

According to another aspect, the present invention provides an image-pickup apparatus including a first detector which produces first information corresponding to a contrast state of a picked-up image, a second detector which receives light from an object to detect second information corresponding to a distance to the object, a focus controller which performs focus control by using the first information and the second information, and a color balance controller which controls color balance in the picked-up image. The focus controller performs the focus control by using the first information without using the second information when information on a light-receiving state of the second detector is not changed in accordance with a change in a control state of the color balance with the color balance controller.

According to yet another aspect, the present invention provides an image-pickup apparatus including a first detector which produces first information corresponding to a contrast state of a picked-up image, a second detector which receives light from an object to detect second information corresponding to a distance to the object, a focus controller which performs focus control by using the first information and the second information, and a shake detector which detects shake of the image-pickup apparatus. The focus controller performs the focus control by using the first information without using the second information when information on a light-receiving state of the second detector is not changed in accordance with a change in a shake detection state with the shake detector.

According to still another aspect, the present invention provides a focus control method for an image-pickup apparatus which includes a step of acquiring first information corresponding to a contrast state of a picked-up image produced by using an image-pickup element, a step of acquiring second information corresponding to a distance to an object by using a detector which receives light from the object, a focus control step of performing focus control by using the first information and the second information, and controlling an aperture stop for adjusting an amount of light entering the image-pickup element. The focus control step includes performing the focus control by using the first information without using the second information when information on a light-receiving state of the detector is not changed in accordance with a change in a control state of the aperture stop in the aperture control step.

According to a further aspect, the present invention provides a focus control method for an image-pickup apparatus which includes a step of acquiring first information corresponding to a contrast state of a picked-up image, a step of acquiring second information corresponding to a distance to an object by using a detector which receives light from the object, a focus control step of performing focus control by using the first information and the second information, and a color balance control step of controlling color balance in the picked-up image. The focus controlling step includes performing the focus control by using the first information without using the second information when information on a light-receiving state of the detector is not changed in accordance with a change in a control state of the color balance in the color balance control step.

According to a yet further aspect, the present invention provides a focus control method for an image-pickup apparatus which includes a step of acquiring first information corresponding to a contrast state of a picked-up image, a step of acquiring second information corresponding to a distance to an object by using a detector which receives light from the object, a focus control step of performing focus control by using the first information and the second information, and a shake detection step of detecting shake of the image-pickup apparatus. The focus control step includes performing the focus control by using the first information without using the second information when information on a light-receiving state of the detector is not changed in accordance with a change in a shake detection state in the shake detection step.

Other objects and features of the present invention will be apparent from the following description of preferred embodiments with reference to the accompanying drawings.

BRIEF DESCRIPTION OF THE DRAWINGS

FIG. 12 is a flow chart showing the procedure of AF control in Embodiment 4.

DETAILED DESCRIPTION OF THE PREFERRED EMBODIMENTS

Preferred embodiments of the present invention will hereinafter be described with reference to the drawings.

Embodiment 1

Figure 1:
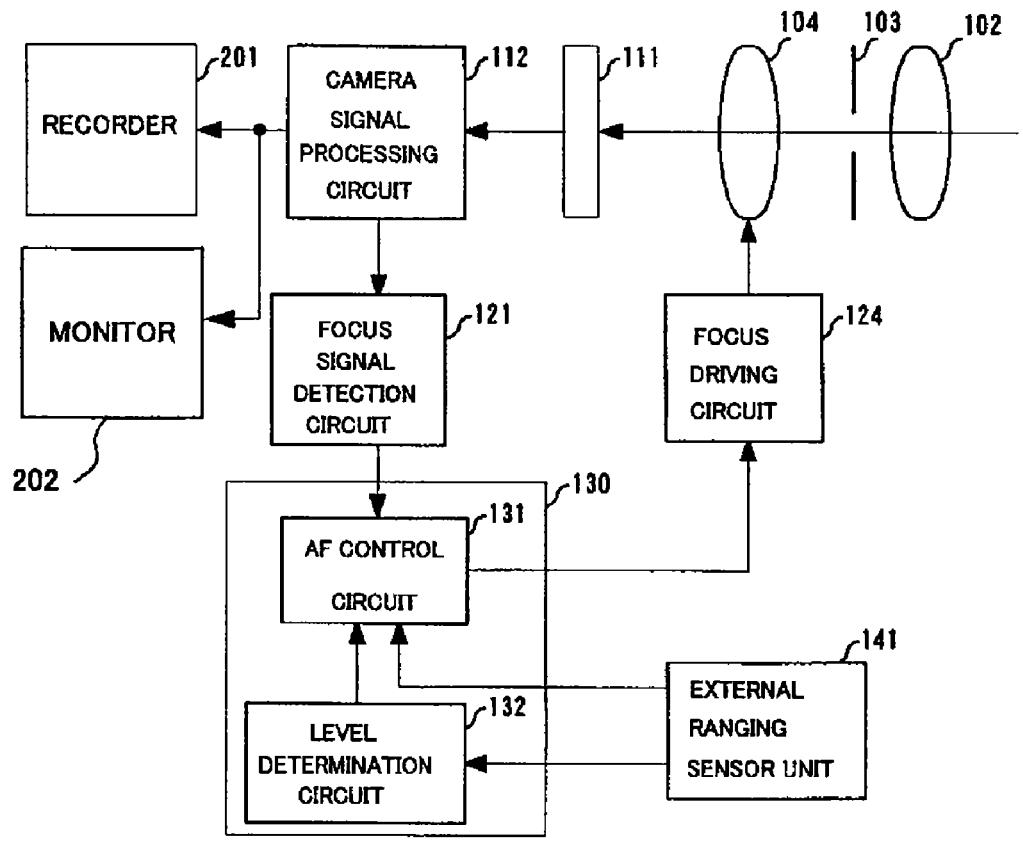
FIG. 1 is a block diagram showing the configuration of a video camera which is Embodiment 1 of the present invention.

FIG. 1 shows the configuration of a video camera (image-pickup apparatus) which is Embodiment 1 of the present invention. While Embodiment 1 is described in conjunction with the video camera, alternative embodiments of the present invention include other image-pickup apparatuses such as a digital still camera. This applies to Embodiments 2 to 8, later described.

In FIG. 1, reference numeral 102 shows a fixed lens, 103 an aperture stop, and 104 a focus lens which is movable in the direction of an optical axis to perform focusing. The fixed lens 102, the aperture stop 103, and the focus lens 104 constitute an image-pickup optical system.

Reference numeral 111 shows an image-pickup element which is formed of a CCD sensor, a CMOS sensor or the like and serves as a photoelectric conversion element. A luminous flux from an object passes through the fixed lens 102, the aperture stop 103, and the focus lens 104, and then forms an image on the image-pickup element 111. The formed object image is photoelectrically converted by the image-pickup element 111 which in turn outputs an image-pickup signal.

Reference numeral 124 shows a focus driving circuit which drives the focus lens 104 in the optical axis direction. The focus driving circuit 124 includes an actuator such as a stepping motor, a DC motor, a vibration type motor, and a voice coil motor, and a driving circuit which drives the actuator.

Reference numeral 112 shows a camera signal processing circuit which converts the image-pickup signal output from the image-pickup element 111 into a standard video signal (video signal) such as an NTSC signal. Reference numeral 201 shows a recorder which records the video signal output from the camera signal processing circuit 112 on a recording medium such as a magnetic tape, an optical disk, and a semiconductor memory.

Reference numeral 202 shows a monitor which is formed of, for example an LCD, and displays the video signal output from the camera signal processing circuit 112 as video.

Reference numeral 121 shows a focus signal detection circuit which serves as a first detector. The focus signal detection circuit 121 extracts a high-frequency component from a luminance signal component of the video signal output from the camera signal processing circuit 112 or a luminance difference component (difference between the highest and lowest values of the luminance level) produced from the high-frequency component to produce an AF evaluation value signal serving as first information.

The AF evaluation value signal represents the sharpness (contrast state) of the video (picked-up image) produced on the basis of the video signal from the image-pickup element 111. The sharpness depends on the focus state of the image-pickup optical system and consequently the AF evaluation value signal represents the focus state of the image-pickup optical system.

Reference numeral 131 shows an AF control circuit which is provided in a microcomputer (CPU) 130. The microcomputer 130 serving as a controller is responsible for the operation of the overall video camera. The AF control circuit 131 performs focus control in which it controls the focus driving circuit 124 to move the focus lens 104. Specifically, the AF control circuit 131 performs focus control in the TV-AF method (hereinafter referred to simply as TV-AF) and focus control in the external ranging (external phase difference detection) method (hereinafter referred to simply as external ranging AF).

The TV-AF refers to focus control to achieve an in-focus state by moving the focus lens 104 and monitoring a change in the AF evaluation value signal associated with the movement to detect the position of the focus lens 104 where the AF evaluation value signal is at the maximum.

Figure 7:
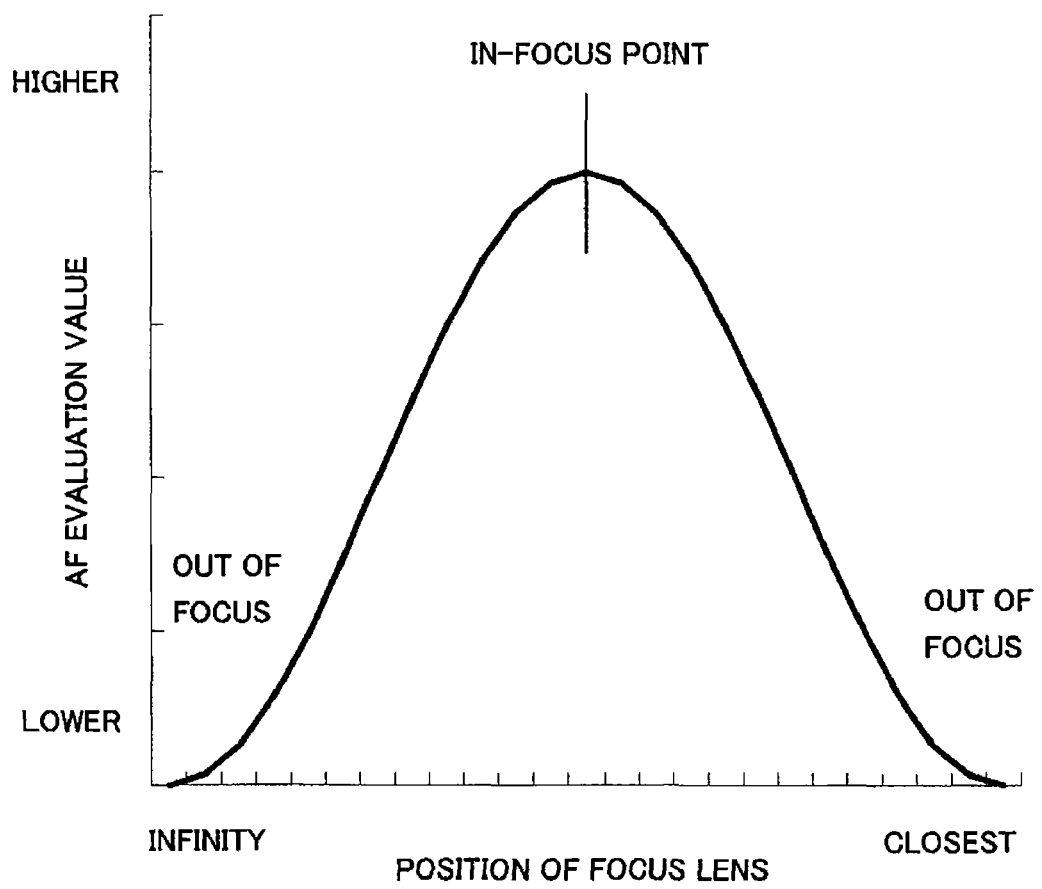
FIG. 7 shows the basis for TV-AF in Embodiments.

A high-frequency component is typically extracted from a luminance signal component of a video signal through a band-pass filter for a certain band of frequencies and is used as the AF evaluation value signal. The high-frequency component changes as shown in FIG. 7 when the focus lens 104 is moved from the closest to infinity to pick up an image of an object at a particular distance. In FIG. 7, the position of the focus lens 104 where the AF evaluation value signal is at the maximum corresponds to the in-focus position (in-focus point) for that object.

In FIG. 1, reference numeral 141 shows an external ranging sensor unit which serves as a second detector and supplies the AF control circuit 131 with object distance information corresponding to an object distance as second information. In response to the supplied object distance information, the AF control circuit 131 calculates the position of the focus lens 104 where the in-focus state is achieved for that object distance, and moves the focus lens 104 to that in-focus position. The external ranging AF is performed in this manner.

The calculation in the AF control circuit 131 includes not only calculations using expressions but also reading of data on in-focus positions for object distances stored previously in memory, not shown.

Figure 9:
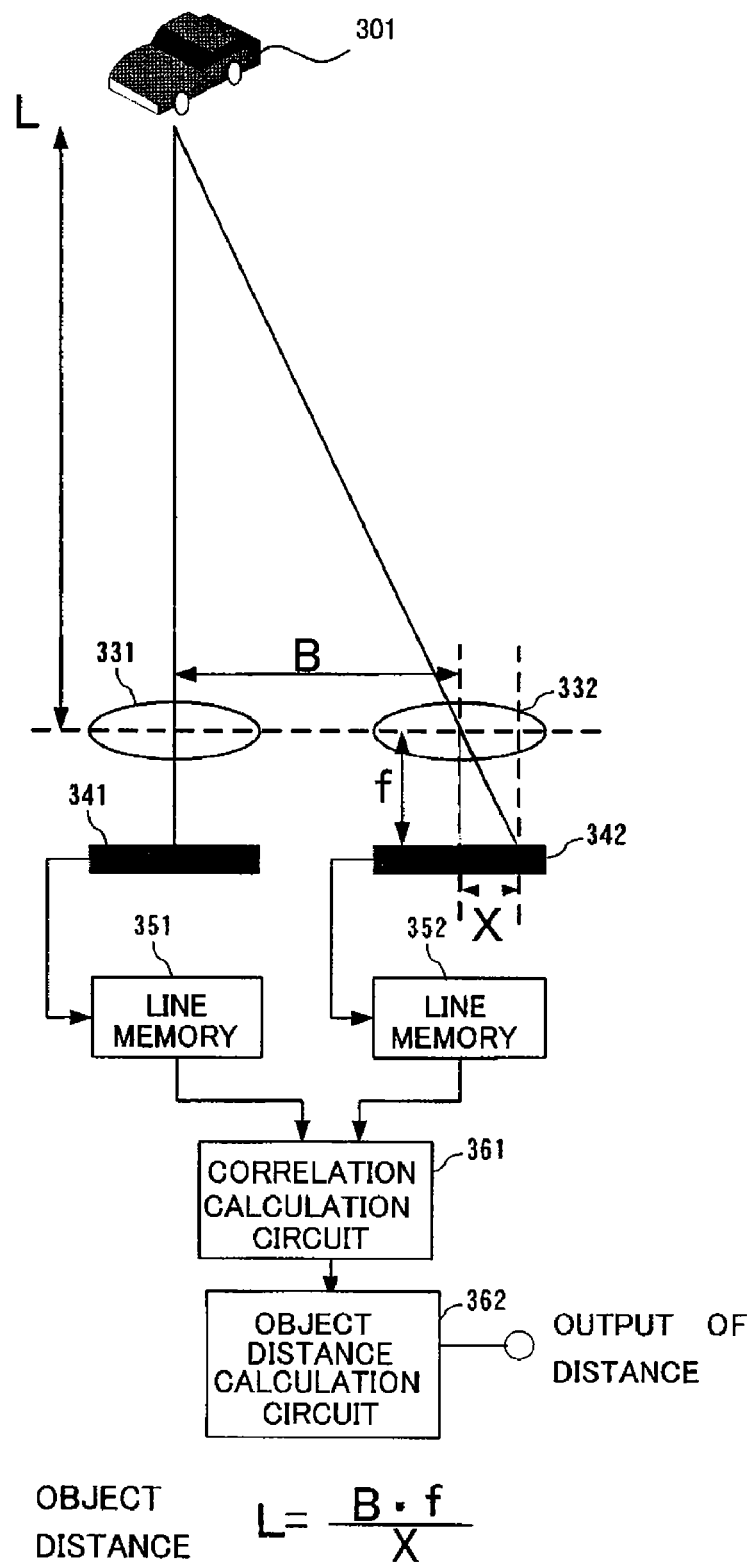
FIG. 9 shows how to measure a distance in Embodiments.
Figure 10:
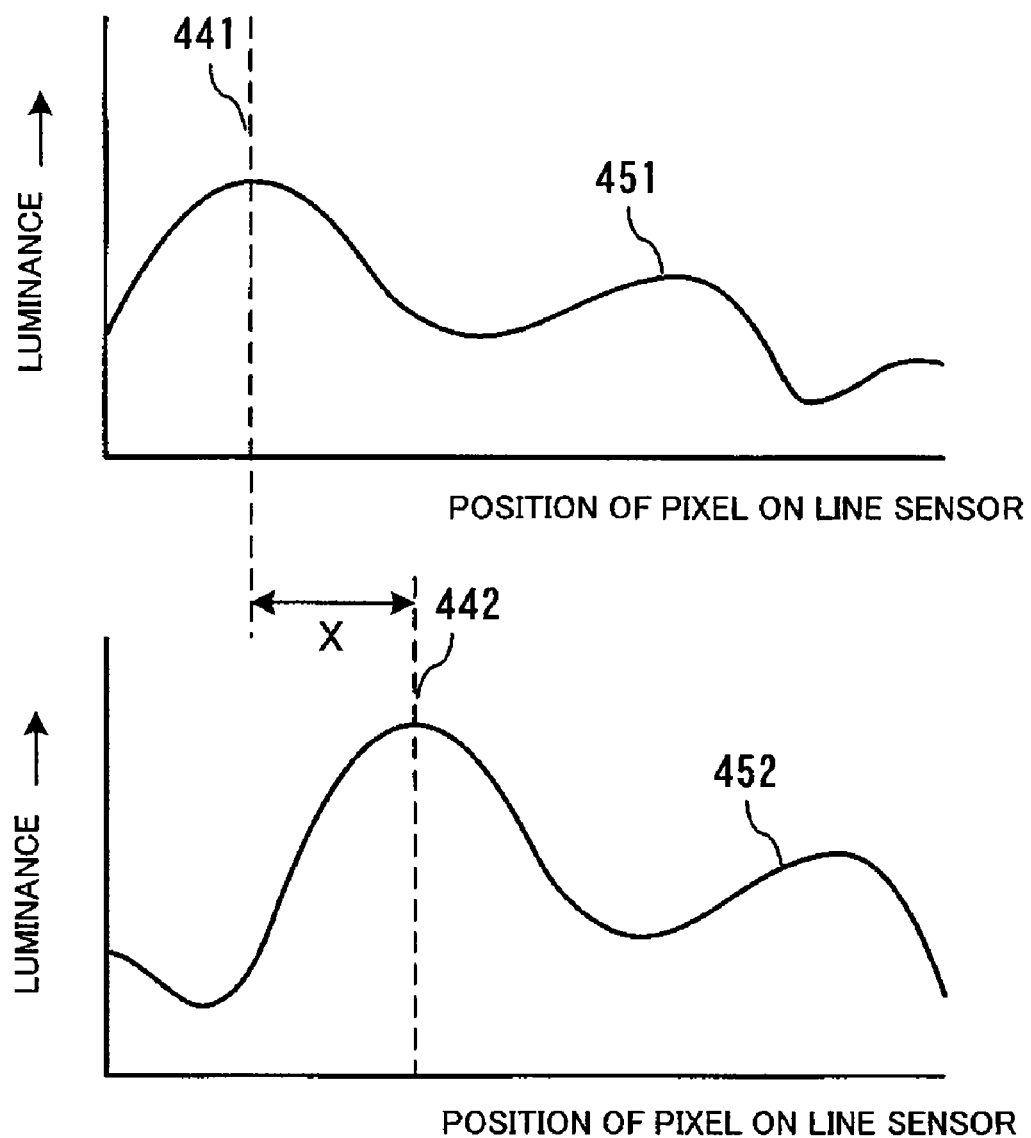
FIG. 10 shows the waveforms of image signals used for calculating correlation in Embodiments.

Next, description will be made of how to detect an object distance with the external ranging sensor unit 141. Various methods have been used for ranging (distance measurement). FIGS. 9 and 10 show the principle of distance measurement in a phase difference passive method as one of those methods.

The external ranging sensor unit 141 is used as a ranging sensor for a so-called passive AF method in Embodiment 1. The external ranging sensor unit 141 is provided separately from the image-pickup optical system. In other words, the external ranging sensor unit 141 receives a luminous flux which travels from an object and does not pass through the image-pickup optical system.

FIG. 9 shows an example of the configuration of the external ranging sensor unit 141. In FIG. 9, reference numeral 301 shows an object, 331 a first image-forming lens, 341 a first light-receiving element array (line sensor), 332 a second image-forming lens, and 342 a second light-receiving element array (line sensor). Each of the first and second line sensors 341 and 342 is formed of a plurality of light-receiving elements (pixels) arranged in a line. The first and second line sensors 341 and 342 are placed with an interval of a base length B therebetween.

Part of light from the object 301 passes through the first image-forming lens 331 and forms an image on the first line sensor 341. Part of light from the object 301 passes through the second image-forming lens 332 and forms an image on the second line sensor 342.

The two object images formed on the line sensors 341 and 342 are photoelectrically converted by those line sensors. Signals (image signals) read out from the line sensors 341 and 342 are accumulated on line memories 351 and 352, respectively. FIG. 10 shows an image signal 451 read out from the line sensor 341 and accumulated on the line memory 351 and an image signal 452 read out from the other line sensor 342 and accumulated on the line memory 352.

The two image signals 451 and 452 accumulated on the line memories 351 and 352, respectively, are then input to a correlation calculation circuit 361. The correlation calculation circuit 361 calculates an uncorrelated value between the two image signals.

Specifically, the correlation calculation circuit 361 first compares an amount of light (luminance of received light) of each pixel in the line sensor 341 with an amount of light of the associated pixel in the line sensor 342, determines the difference between them for each pixel, and adds up the light amount differences between the paired pixels to provide the uncorrelated value.

Next, one of the paired pixels for which the light amount difference was determined is shifted relative to the other pixel with a displacement amount corresponding to one pixel in a direction along the arranged pixels, and the light amount difference and the uncorrelated value are calculated as described above. In this manner, one of the paired pixels is shifted relative to the other pixel with the displacement amount corresponding to one pixel in the same direction sequentially, and the uncorrelated value is calculated for each shift. In addition, one of the paired pixels is shifted relative to the other pixel in the opposite direction sequentially, and the uncorrelated value is calculated for each shift.

As a result of the abovementioned calculations, the shift amount with the highest correlation value is defined as the pixel shift amount with the lowest uncorrelated value, that is, the pixel shift amount in the pair of pixels having the smallest luminance difference, of plural pairs of pixels in which their luminance amounts are compared with each other. Specifically, in FIG. 10, a shift amount X with the highest correlation value corresponds to a distance X between compared pixels 441 and 442 having the lowest uncorrelated value when the correlation is examined between the image signals 451 and 452. The shift amount can be calculated as (number of shifted pixels×pixel size).

Next, an object distance calculation circuit 362 determines a distance L to the object by using the principle of triangulation based on the pixel shift amount.

The object distance L is calculated with the following expression (1):

$$L = Bf/X \qquad (1)$$

where X represents the pixel shift amount (see FIG. 10), B the base length, and f the focal length of the image-forming lenses 331 and 332.

While the passive ranging method is used in Embodiment 1, other ranging methods may be used. For example, an active ranging method may be used such that infrared rays are emitted and the triangulation is used to determine the object distance. Alternatively, the external ranging unit may output the above-mentioned pixel shift amount X (second information) which in turn is used by the microcomputer to determine the object distance based on X.

In FIG. 1, reference numeral 132 shows a level determination circuit which is provided in the microcomputer 130 and determines the levels of the luminance components (hereinafter referred to as light-receiving luminance levels) of the image signals output from the line sensors 341 and 342 in the external ranging sensor unit 141. Specifically, the level determination circuit 132 determines whether the light-receiving luminance levels of the line sensors 341 and 342 are higher than a predetermined luminance level (first value) or not. The level determination circuit 132 transmits the result to the AF control circuit 131.

Figure 2:
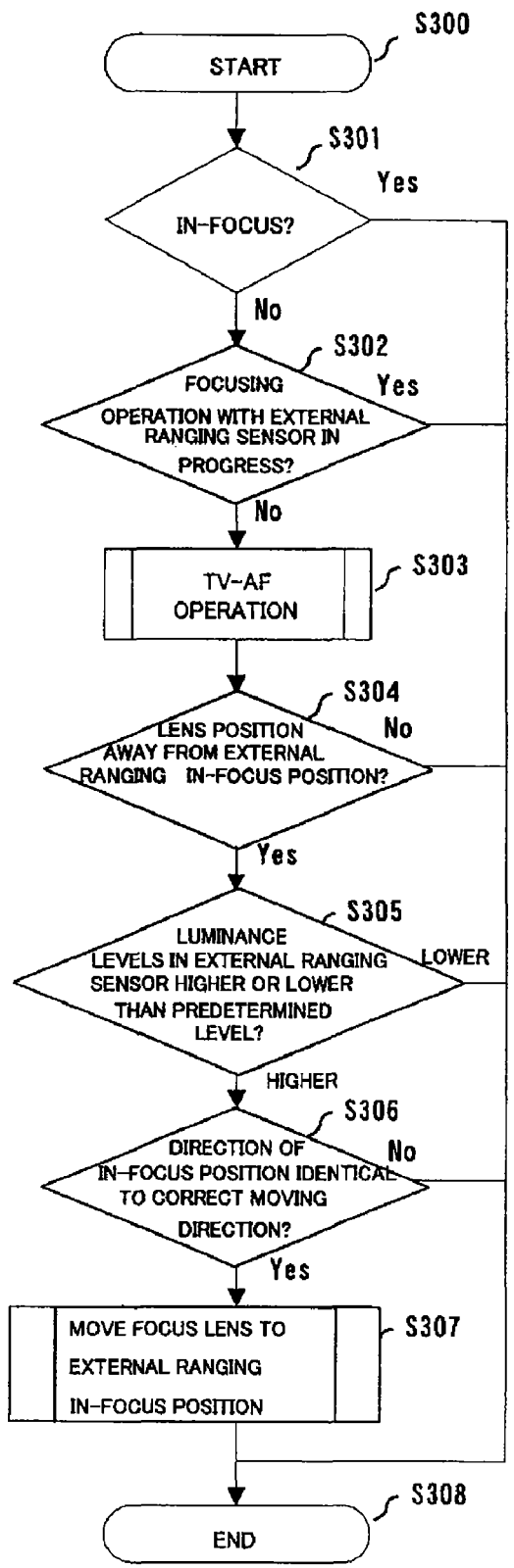
FIG. 2 is a flow chart showing the procedure of AF control in Embodiment 1.

Next, description will be made of the AF control performed by the microcomputer 130 including the AF control circuit 131 in Embodiment 1 with reference to a flow chart in FIG. 2. The AF control is performed in accordance with a computer program stored in the microcomputer 130. This applies to Embodiments 2 to 8, later described.

At step (hereinafter abbreviated to as S) 300, the microcomputer 130 starts the AF control. The processing shown in the flow chart is performed in a read-out cycle of an image-pickup signal from the image-pickup element 111 for producing an image of one field, for example.

At S301, the microcomputer 130 determines whether or not an in-focus state is achieved. If it is determined that the in-focus state is achieved, the flow proceeds to S308, or to S302 if it is determined that the in-focus state is not achieved. The determination of the in-focus state can be performed through the in-focus determination in TV-AF operation, later described.

At S302, the microcomputer 130 determines whether or not the focus lens 104 is in the process of focusing operation with the external ranging AF. If the focusing operation is being performed, the flow proceeds to S308, or to S303 if the focusing operation is not being performed.

Figure 8:
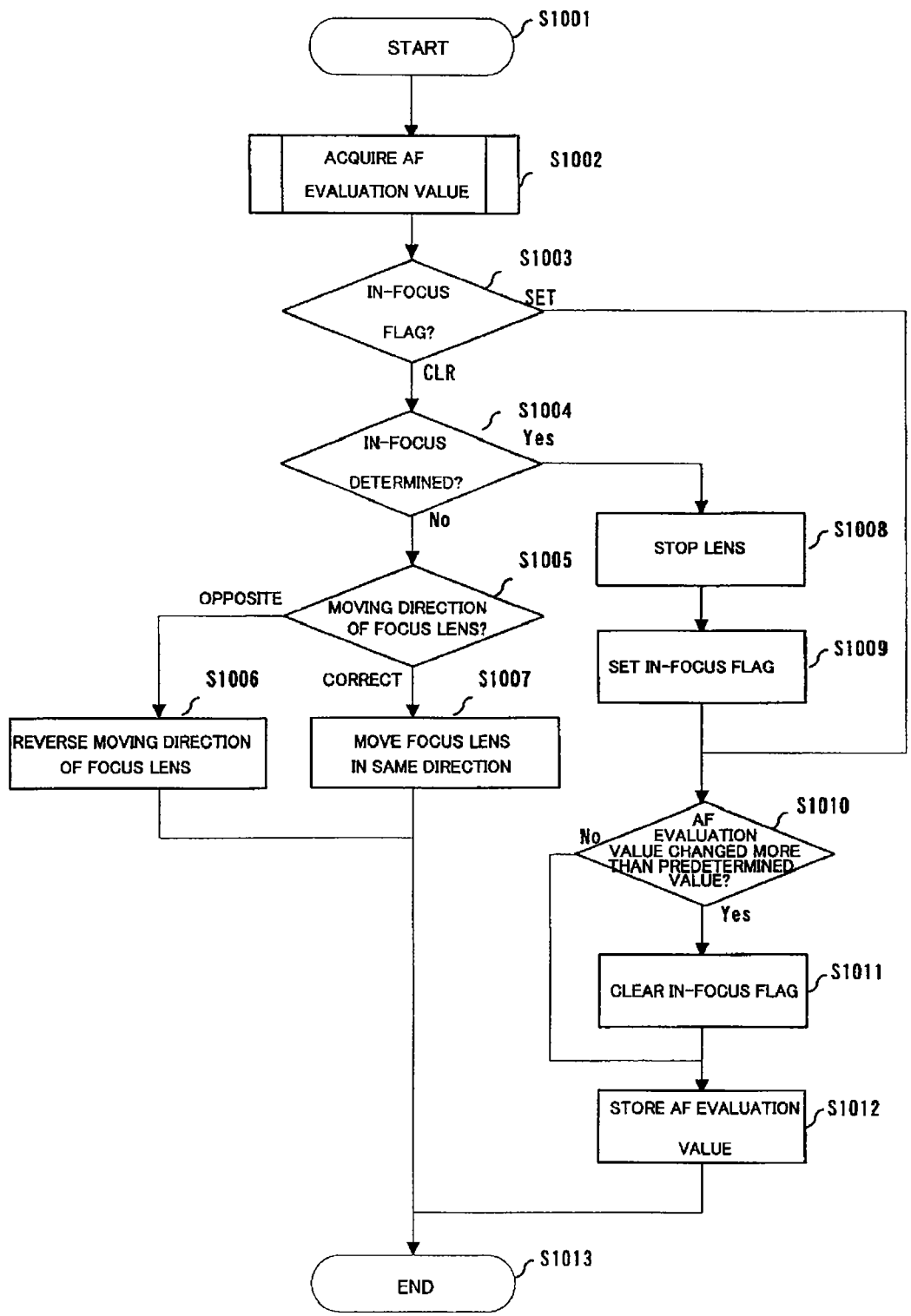
FIG. 8 is a flow chart showing the control procedure of the TV-AF in Embodiments.

At S303, the microcomputer 130 performs the TV-AF operation shown in the flow chart of FIG. 8.

Referring to FIG. 8, the microcomputer 130 starts the focusing processing at S1001. At S1002, the microcomputer 130 acquires an AF evaluation value signal from the focus signal processing circuit 121.

At S1003, an in-focus flag is checked. If the in-focus flag is cleared to indicate an out-of-focus state, the flow proceeds to S1004, or to S1010 if the in-focus flag is set to indicate an in-focus state.

At S1004, it is determined whether or not the in-focus state is determined. The in-focus state is determined when the focus lens 104 is moved in opposite directions alternately a predetermined number of times or more at S1006 and S1007, later described. If the in-focus state is determined, the flow proceeds to S1008, or to S1005 if the in-focus state is not determined.

At S1005, it is determined whether or not the moving direction of the focus lens 104 is correct. For example, when the AF evaluation value acquired in the current routine is higher than the AF evaluation value acquired in the previous routine, the moving direction of the focus lens 104 is directed toward the in-focus position, so that it is determined that the moving direction is correct and the flow proceeds to S1007. On the other hand, when the AF evaluation value acquired in the current routine is lower than the AF evaluation value acquired in the previous routine, the moving direction of the focus lens 104 is opposite to the in-focus position, so that it is determined that the moving direction is not correct and the flow proceeds to S1006.

At S1006, the moving direction of the focus lens 104 is reversed.

At S1007, the focus lens 1004 is moved further in the same direction.

At S1008, it is determined that the in-focus state is achieved, and the focus lens 104 is stopped to maintain the in-focus state.

At S1009, the in-focus flag is set and the AF evaluation value in the in-focus state is stored in memory, not shown.

At S1010, it is determined whether or not the AF evaluation value stored at S1009 in the previous routine is different from the AF evaluation value acquired in the current routine by a predetermined value or more. If the AF evaluation value acquired in the current routine is lower than the stored AF evaluation value by the predetermined value or more, it is determined that the in-focus state is not maintained and the flow proceeds to S1011. If the AF evaluation value acquired in the current routine is lower than the stored AF evaluation value by a difference less than the predetermined value, it is determined that the in-focus state is maintained and the flow proceeds to S1012.

At S1011, the in-focus flag is cleared.

At S1012, the AF evaluation value acquired in the current routine is stored in memory, not shown, instead of the AF evaluation value stored in the previous routine.

At S1013, the TV-AF operation is ended.

At S304 in FIG. 2, the microcomputer 130 uses the object distance information provided by the external ranging sensor unit 141 to calculate the position of the focus lens 104 where the in-focus state can be achieved for that object distance (hereinafter referred to as external ranging in-focus position). The microcomputer 130 compares the external ranging in-focus position with the current position of the focus lens 104 and determines whether or not the current position of the focus lens 104 is away from the external ranging in-focus position. When the focus lens 104 is placed outside a predetermined range including the external ranging in-focus position, the flow proceeds to S305. When the focus lens 104 is placed within the predetermined range including the external ranging in-focus position, the flow proceeds to S308.

At S305, the microcomputer 130 determines whether the light-receiving luminance levels in the line sensors 341 and 342 of the external ranging sensor unit 141 are higher or lower than the predetermined luminance level (first value). In Embodiment 1, it is determined whether the light-receiving luminance level of each line sensor in the pair of line sensors 341 and 342 is higher or lower than the predetermined level. Alternatively, it is possible to determine whether or not the value (that is, the sum) calculated by adding the light-receiving luminance levels in the pair of line sensors 341 and 342 is higher or lower than the predetermined level. When it is determined that the light-receiving luminance levels are higher than the predetermined level, the flow proceeds to S306, or to S308 when it is determined that the light-receiving luminance levels are lower than the predetermined level.

At S306, the microcomputer 130 determines whether or not the direction of the external ranging in-focus position relative to the current position of the focus lens 104 is the same as the correct moving direction (in-focus direction) of the focus lens 104 determined in the TV-AF processing (S1005 in FIG. 8) at S303. If they are the same, it is determined that the external ranging in-focus position (or the object distance information) is correct and the flow proceeds to S307, or to S308 if they are not the same.

At S307, the microcomputer 130 moves the focus lens 104 to the external ranging in-focus position. In other words, the external ranging AF is performed.

At S308, the microcomputer 130 ends the processing of the AF control.

As described above, in Embodiment 1, it is determined whether or not the external ranging AF with the object distance information provided by the external ranging sensor unit 141 should be performed depending on whether the light-receiving luminance levels in the external ranging sensor unit 141 are higher or lower than the predetermined luminance level. If the light-receiving luminance levels are lower, the TV-AF is performed. Thus, when an obstruction such as a hand of a user is present on the optical path between the external ranging sensor unit 141 and the object, the external ranging AF can be prevented from being performed on the basis of the incorrect object distance information, and at the same time, the correct in-focus state can be achieved with the TV-AF.

In addition, according to Embodiment 1, it is determined whether or not the external ranging AF should be performed depending on whether the light-receiving luminance levels in both of the paired line sensors 341 and 342 are higher or lower, so that the abovementioned effects can be attained even when both of the optical paths from the object to the line sensors 341 and 342 are blocked.

Embodiment 2

Figure 3:
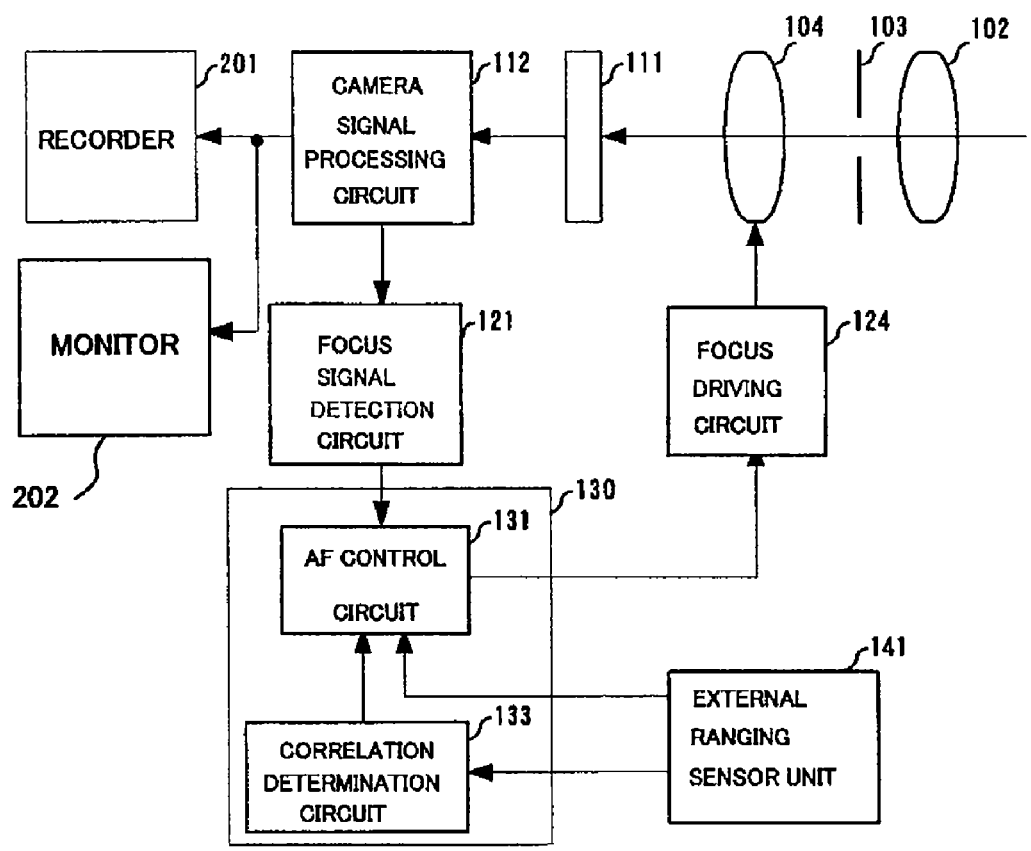
FIG. 3 is a block diagram showing the configuration of a video camera which is Embodiment 2 of the present invention.

FIG. 3 shows the configuration of a video camera which is Embodiment 2 of the present invention. In Embodiment 2, components identical to those in Embodiment 1 are designated with the same reference numerals as those in Embodiment 1.

In Embodiment 1, it is determined whether or not the external ranging AF should be performed depending on whether the light-receiving luminance levels are higher or lower in the external ranging sensor unit 141. In Embodiment 2, it is determined whether or not the external ranging AF should be performed depending on the level of a correlation value of outputs from a pair of line sensors 341 and 342.

The calculation of the correlation value (uncorrelated value) in the external ranging sensor unit 141 and the calculation of an object distance are as described in Embodiment 1. Specifically, two image signals read out from the line sensors 341 and 342 shown in FIG. 9 and accumulated on line memories 351 and 352 are then input to a correlation calculation circuit 361 which in turn calculates the uncorrelated value in the two image signals. An object distance calculation circuit 362 calculates the object distance based on the shift amount between the pixels having the lowest uncorrelated value (the highest correlation value) found from the comparison of the light amount, of the pixels on the line sensors 341 and 342.

In FIG. 3, reference numeral 133 shows a correlation determination circuit which determines the level of the correlation value of the two image signals read out from the pair of line sensors 341 and 342.

Figure 11:
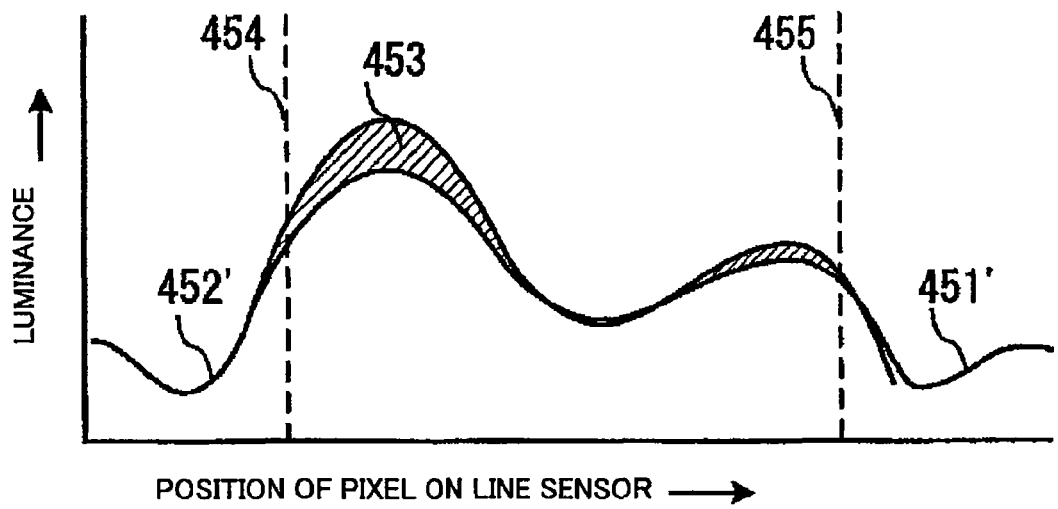
FIG. 11 shows the concept of correlation calculation in Embodiment 2.

The correlation value will be described with reference to FIG. 11. In FIG. 11, reference numeral 451' shows an image signal which is read out from the line sensor 341 and accumulated on the line memory 351, and reference numeral 452' shows an image signal which is read out from the other line sensor 342 and accumulated on the line memory 352. FIG. 11 shows the image signals 451' and 452' shifted by a shift amount X such that they have the highest correlation value.

Reference numerals 454 and 455 show the maximum shift amount when the correlation value is determined in a predetermined correlation comparison area. Typically, the maximum shift amount can be set to a shift amount corresponding to half or more of the length of the line sensor to provide the correlation value with high accuracy.

A hatched portion 453 corresponds to the uncorrelated value of the two image signals described in Embodiment 1. As the uncorrelated value 453 is smaller, that is, the correlation value is larger, the object distance can be determined correctly. The correlation determination circuit 133 determines whether or not the correlation value is larger than a predetermined value and transmits the determination result to an AF control circuit 131 in a microcomputer 130.

Figure 4:
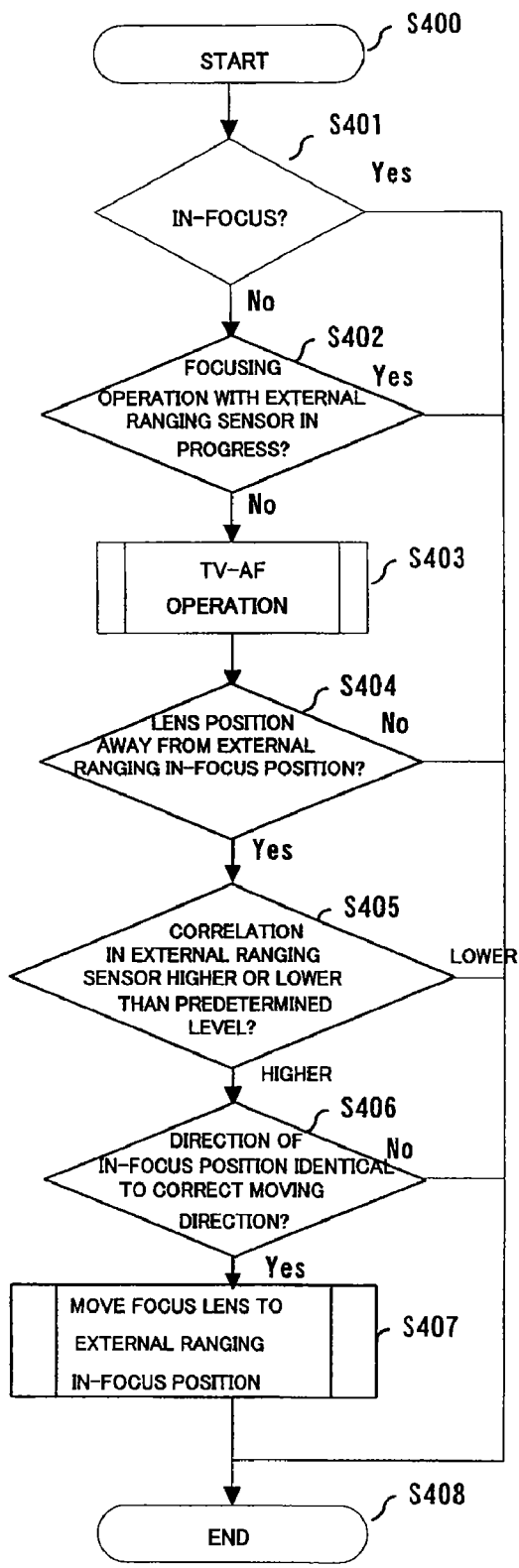
FIG. 4 is a flow chart showing the procedure of AF control in Embodiment 2.

Next, description will be made of AF control performed by the microcomputer 130 including the AF control circuit 131 with reference to a flow chart in FIG. 4.

At S400, the microcomputer 130 starts the AF control. The processing shown in the flow chart is performed in a read-out cycle of an image-pickup signal from an image-pickup element 111 for producing an image of one field, for example.

At S401, the microcomputer 130 determines whether or not an in-focus state is achieved. If it is determined that the in-focus state is achieved, the flow proceeds to S408, or to S403 if it is determined that the in-focus state is not achieved. The determination of the in-focus state can be performed through the in-focus determination in TV-AF operation, later described.

At S402, the microcomputer 130 determines whether or not a focus lens 104 is in the process of focusing operation with the external ranging AF. If the focusing operation is being performed, the flow proceeds to S408, or to S403 if the focusing operation is not being performed.

At S403, the microcomputer 130 performs the TV-AF operation shown in the flow chart of FIG. 8.

At S404, the microcomputer 130 uses the object distance information provided by the external ranging sensor unit 141 to calculate the external ranging in-focus position of the focus lens 104 where the in-focus state can be achieved for that object distance. The microcomputer 130 compares the external ranging in-focus position with the current position of the focus lens 104 and determines whether or not the current position of the focus lens 104 is away from the external ranging in-focus position. When the focus lens 104 is placed outside a predetermined range including the external ranging in-focus position, the flow proceeds to S405. When the focus lens 104 is placed within the predetermined range including the external ranging in-focus position, the flow proceeds to S408.

At S405, the microcomputer 130 determines whether the correlation value of the image signals on the line sensors 341 and 342 provided by the external ranging sensor unit 141 is higher or lower than the predetermined value (first value). When it is determined that the correlation value is higher than the predetermined value, the flow proceeds to S406, or to S408 when it is determined that the correlation value is lower than the predetermined value.

At S406, the microcomputer 130 determines whether or not the direction of the external ranging in-focus position relative to the current position of the focus lens 104 is the same as the correct moving direction of the focus lens 104 determined in the TV-AF processing (S1005 in FIG. 8) at S403. If they are the same, it is determined that the external ranging in-focus position (or the object distance information) is correct and the flow proceeds to S407, or to S408 if they are not the same.

At S407, the microcomputer 130 moves the focus lens 104 to the external ranging in-focus position. In other words, the external ranging AF is performed.

At S408, the microcomputer 130 ends the processing of the AF control.

As described above, in Embodiment 2, it is determined whether or not the external ranging AF with the object distance information provided by the external ranging sensor unit 141 should be performed depending on whether the correlation value of the image signals provided by the external ranging sensor unit 141 is higher or lower than the predetermined value. If the correlation value is lower, the TV-AF is performed. Thus, when an obstruction such as a hand of a user is present on the optical path between the external ranging sensor unit 141 and the object, the external ranging AF can be prevented from being performed on the basis of the incorrect object distance information, and at the same time, the correct in-focus state can be achieved with the TV-AF.

Embodiment 3

Figure 5:
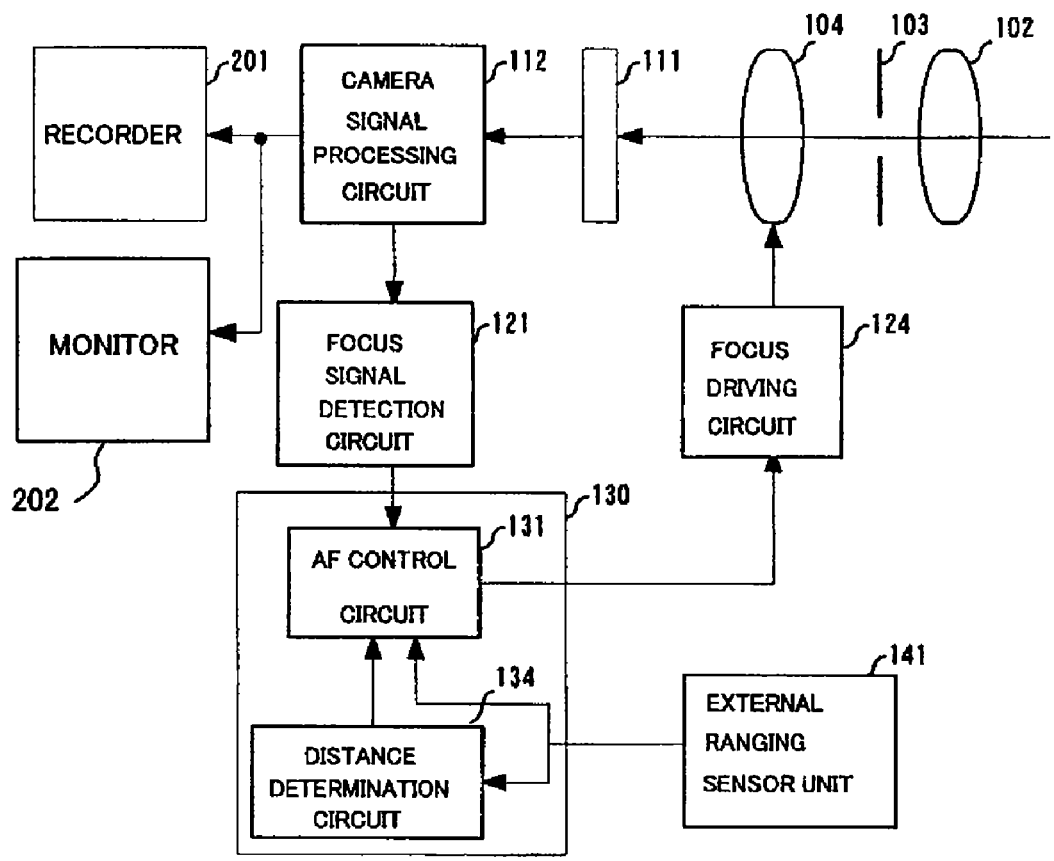
FIG. 5 is a block diagram showing the configuration of a video camera which is Embodiment 3 of the present invention.

FIG. 5 shows the configuration of a video camera which is Embodiment 3 of the present invention. In Embodiment 3, components identical to those in Embodiment 1 are designated with the same reference numerals as those in Embodiment 1.

The calculation of an object distance in an external ranging sensor unit 141 in Embodiment 3 is as described in Embodiment 1. Specifically, two image signals read out from line sensors 341 and 342 shown in FIG. 9 and accumulated on line memories 351 and 352 are then input to a correlation calculation circuit 361 which in turn calculates the uncorrelated value in the two image signals. An object distance calculation circuit 362 calculates the object distance based on the shift amount between the pixels having the lowest uncorrelated value (the highest correlation value) found from the comparison of the light amount, of the pixels on the line sensors 341 and 342.

In FIG. 5, reference numeral 134 shows a distance determination circuit 134 which determines whether an object distance provided by the external ranging sensor unit 141 is shorter or longer than a predetermined distance (first distance: several centimeters, for example). The distance determination circuit 134 transmits the determination result to an AF control circuit 131 in a microcomputer 130.

Figure 6:
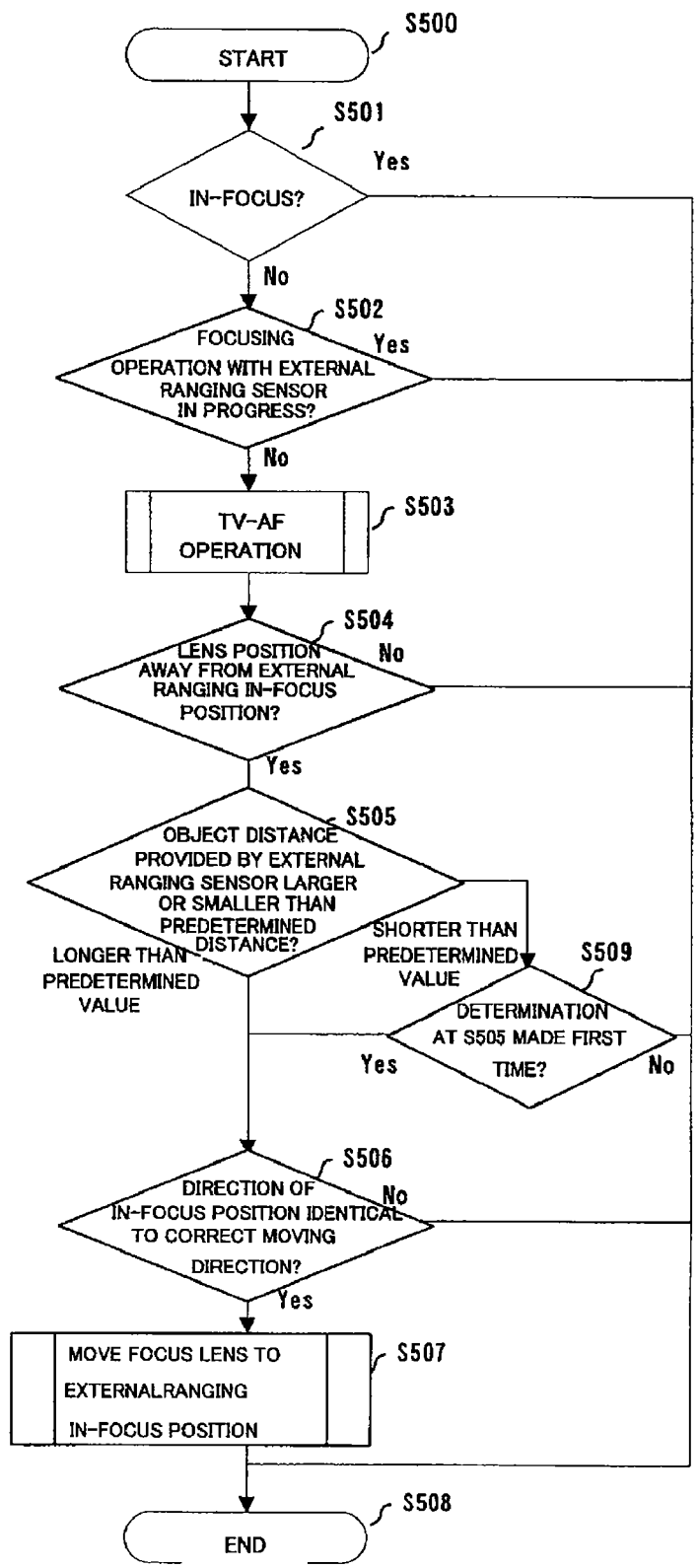
FIG. 6 is a flow chart showing the procedure of AF control in Embodiment 3.

Next, description will be made of AF control performed by the microcomputer 130 including the AF control circuit 131 with reference to a flow chart in FIG. 6.

At S500, the microcomputer 130 starts the AF control. The processing shown in the flow chart is performed in a read-out cycle of an image-pickup signal from an image-pickup element 111 for producing an image of one field, for example.

At S501, the microcomputer 130 determines whether or not an in-focus state is achieved. The determination of the in-focus state can be performed through in-focus determination in TV-AF operation, later described. If it is determined that the in-focus state is achieved, the flow proceeds to S508, or to S503 if it is determined that the in-focus state is not achieved.

At S502, the microcomputer 130 determines whether or not a focus lens 104 is in the process of focusing operation with the external ranging AF. If the focusing operation is being performed, the flow proceeds to S508, or to S503 if the focusing operation is not being performed.

At S503, the microcomputer 130 performs the TV-AF operation shown in the flow chart of FIG. 8.

At S504, the microcomputer 130 uses the object distance information provided by the external ranging sensor unit 141 to calculate the external ranging in-focus position of the focus lens 104 where the in-focus state can be achieved for that object distance. The microcomputer 130 compares the external ranging in-focus position with the current position of the focus lens 104 and determines whether or not the current position of the focus lens 104 is away from the external ranging in-focus position. When the focus lens 104 is placed outside a predetermined range including the external ranging in-focus position, the flow proceeds to S505. When the focus lens 104 is placed within the predetermined range including the external ranging in-focus position, the flow proceeds to S508.

At S505, the microcomputer 130 determines whether the object distance provided by the external ranging sensor unit 141 is nearer (shorter) or further (longer) than the predetermined distance. When it is determined that the object distance is longer than the predetermined distance, the flow proceeds to S506, or to S508 when it is determined that the object distance is shorter than the predetermined distance.

At S509, the microcomputer 130 determines whether or not the determination of the object distance provided by the external ranging sensor unit 141 to be shorter than the predetermined distance was made for the first time at S505. In other words, the microcomputer 130 determines whether or not the object distance was determined to be longer than the predetermined distance in the previous routine. This determination is made because the external ranging AF is limited only when it is successively determined that the object distance is shorter than the predetermined distance in the two consecutive routines. When the determination was made for the first time at S505, the flow proceeds to S506, or to S508 when the determination was made for the second or subsequent time at S505.

At S506, the microcomputer 130 determines whether or not the direction of the external ranging in-focus position relative to the current position of the focus lens 104 is the same as the correct moving direction of the focus lens 104 determined in the TV-AF processing (S1005 in FIG. 8) at S503. If they are the same, it is determined that the external ranging in-focus position (or the object distance information) is correct and the flow proceeds to S507, or to S508 if they are not the same.

At S507, the microcomputer 130 moves the focus lens 104 to the external ranging in-focus position. In other words, the external ranging AF is performed.

At S508, the microcomputer 130 ends the processing of the AF control.

As described above, in Embodiment 3, it is determined whether or not the external ranging AF with the object distance information should be performed depending on whether the object distance provided by the external ranging sensor unit 141 is longer or shorter than the predetermined distance. If the object distance is shorter, the TV-AF is performed. Thus, when an obstruction such as a hand of a user is present on the optical path between the external ranging sensor unit 141 and the object, the external ranging AF can be prevented from being performed on the basis of the information on the distance to that obstruction as the object distance information, and at the same time, the correct in-focus state can be achieved with the TV-AF.

Even when it is determined that the object distance is shorter, the external ranging AF is performed once by using the object distance information provided by the external ranging sensor unit 141. This enables fast focusing for an object at a close distance.

According to Embodiments 1 to 3, when the light-receiving luminance level or the correlation value in the second detector is low to indicate that the second information detected by the second detector is likely to be incorrect, focus control is performed with the first information without performing focus control with the second information. Therefore, the focus control based on the incorrect second information can be prevented from being performed and the correct in-focus state can be achieved.

Embodiment 4

Figure 12:
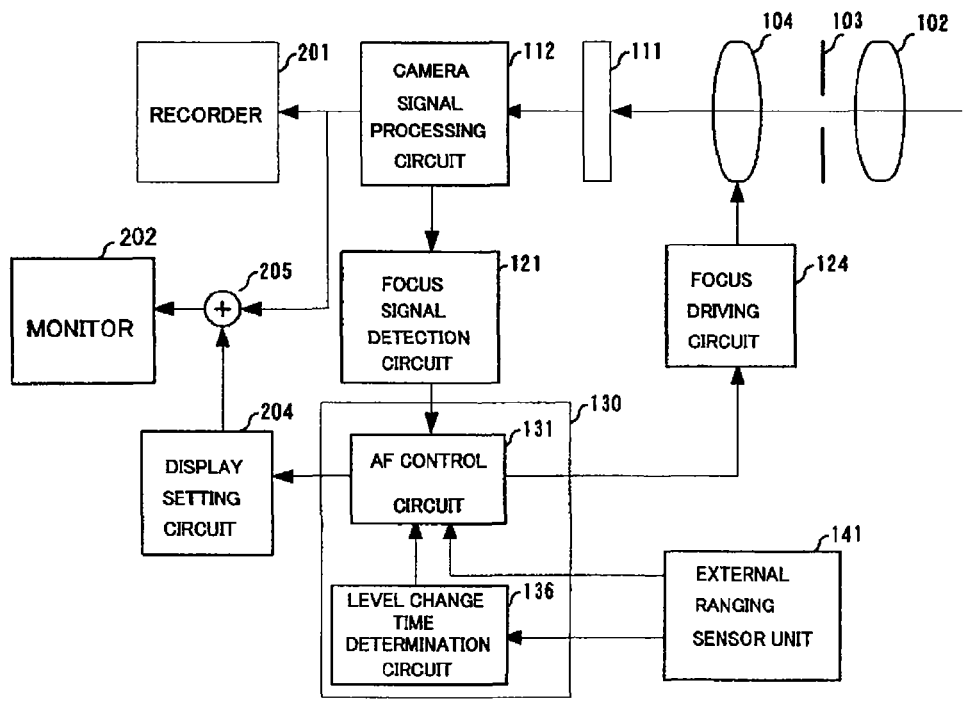
FIG. 12 is a block diagram showing the configuration of a video camera which is Embodiment 4 of the present invention.

FIG. 12 shows the configuration of a video camera (image-pickup apparatus) which is Embodiment 4 of the present invention. In FIG. 12, components identical to those in Embodiments 1 to 3 are designated with the same reference numerals as those in Embodiments 1 to 3.

Reference numeral 204 shows a display setting circuit which outputs a character display signal representing characters such as letters and graphics prepared in memory (not shown) of the display setting circuit 204 to a superimposing circuit 205. In this case, both of video (picked-up images) and the characters are displayed on a monitor 202.

Reference numeral 136 shows a level change time determination circuit which determines whether or not the levels of luminance components (hereinafter referred to as light-receiving luminance levels) of image signals output from line sensors 341 and 342 in an external ranging sensor unit 141 are lower than a predetermined luminance level (first value). The level change time determination circuit 136 also determines whether or not a state in which the light-receiving luminance levels are lower than the predetermined luminance level continues for a predetermined time period (first time period) or longer.

The predetermined luminance level and the predetermined time period are previously stored in memory, not shown, in a microcomputer 130. The level change time determination circuit 136 transmits the determination results to an AF control circuit 131 in the microcomputer 130.

Figure 13:
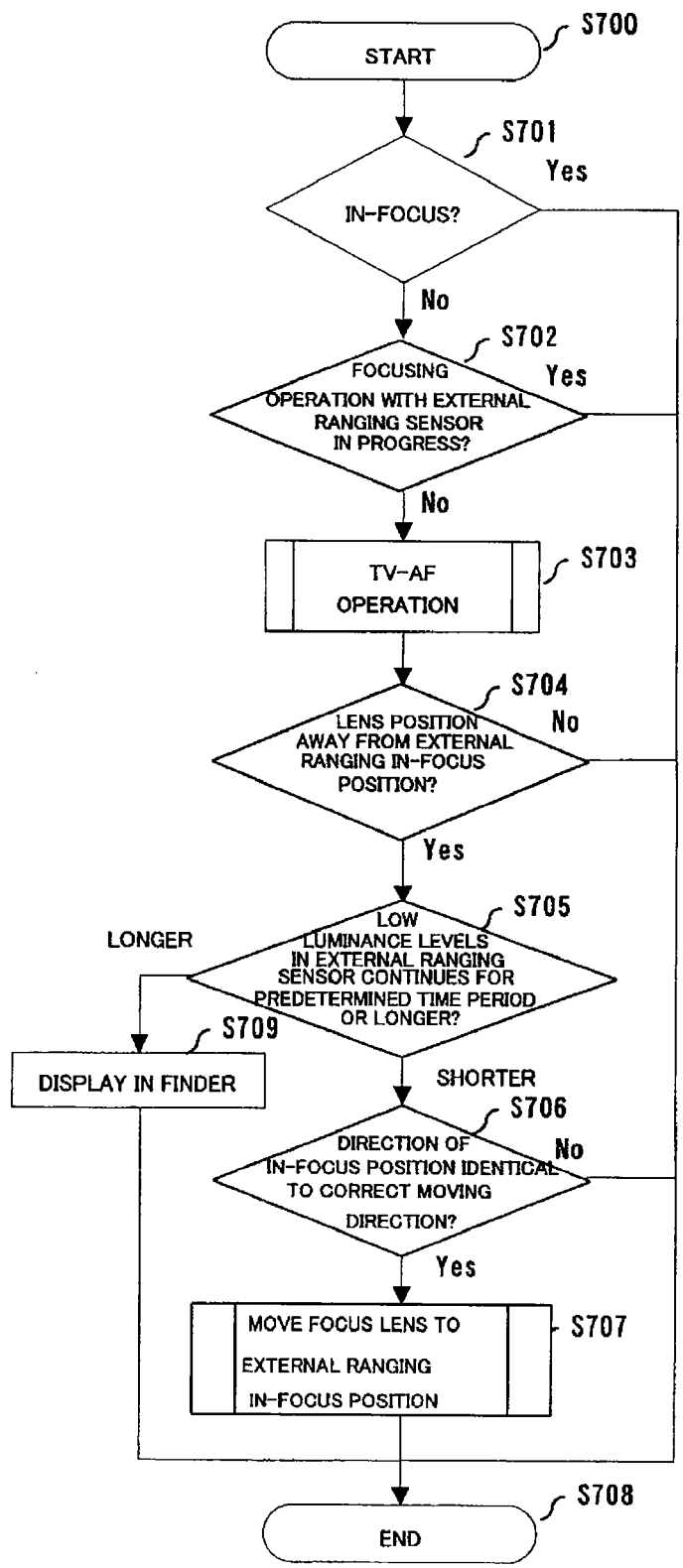

Next, description will be made of AF control performed by the microcomputer 130 including the AF control circuit 131 in Embodiment 4 with reference to the flow chart in FIG. 13.

At S700, the microcomputer 130 starts the AF control. The processing shown in the flow chart is performed in a read-out cycle of an image-pickup signal from an image-pickup element 111 for producing an image of one field, for example.

At S701, the microcomputer 130 determines whether or not an in-focus state is achieved. If it is determined that the in-focus state is achieved, the flow proceeds to S708, or to S702 if it is determined that the in-focus state is not achieved. The determination of the in-focus state can be performed through the in-focus determination in TV-AF operation.

At S702, the microcomputer 130 determines whether or not a focus lens 104 is in the process of focusing operation with the external ranging AF. If the focusing operation is being performed, the flow proceeds to S708, or to S703 if the focusing operation is not being performed.

At S703, the microcomputer 130 performs the TV-AF operation shown in the flow chart in FIG. 8.

At S704, the microcomputer 130 uses the object distance information provided by the external ranging sensor unit 141 to calculate the position of the focus lens 104 (hereinafter referred to as an external ranging in-focus position) where the in-focus state can be achieved for that object distance. The microcomputer 130 compares the external ranging in-focus position with the current position of the focus lens 104 detected by a lens position detector, not shown, and determines whether or not the current position of the focus lens 104 is away from the external ranging in-focus position. When the focus lens 104 is placed outside a predetermined range including the external ranging in-focus position, the flow proceeds to S705. When the focus lens 104 is placed within the predetermined range including the external ranging in-focus position, the flow proceeds to S708.

At S705, the microcomputer 130 determines whether or not the light-receiving luminance levels in the line sensors 341 and 342 of the external ranging sensor unit 141 are lower than the predetermined luminance level (first value). In Embodiment 4, it is determined whether or not the light-receiving luminance level of each line sensor in the pair of line sensors 341 and 342 is lower than the predetermined luminance level. Alternatively, it is possible to determine whether or not the value (that is, the sum) calculated by adding the light-receiving luminance levels in the pair of line sensors 341 and 342 is lower than the predetermined level.

In addition, at S705, when it is determined that the light-receiving luminance levels are lower than the predetermined luminance level, the microcomputer 130 determines whether or not a state in which the light-receiving luminance levels are lower than the predetermined luminance level continues for the predetermined time period or longer. If the state continues for the predetermined time period or longer, the flow proceeds to S709, or to S706 if not.

At S706, the microcomputer 130 determines whether or not the direction of the external ranging in-focus position calculated from the object distance information provided by the external ranging sensor unit 141 is the same as the correct moving direction of the focus lens 104 determined in the TV-AF processing (S1005 in FIG. 8) at S703. If they are the same, the microcomputer 130 determines that the detection result of the object distance by the external ranging sensor is correct and the flow proceeds to S707, or to S708 if they are not the same.

At S707, the microcomputer 130 moves the focus lens 104 to the external ranging in-focus position. In other words, the external ranging AF is performed.

At S709, the microcomputer 130 causes the display setting circuit 204 to display characters on the monitor 202, for example with letters "information from distance sensor not used" or graphics representing that fact.

At S708, the microcomputer 130 ends the processing of the AF control.

Next, description will be made of the change of the light-receiving luminance level in the external ranging sensor unit 141 with reference to FIG. 16.

Figure 16:
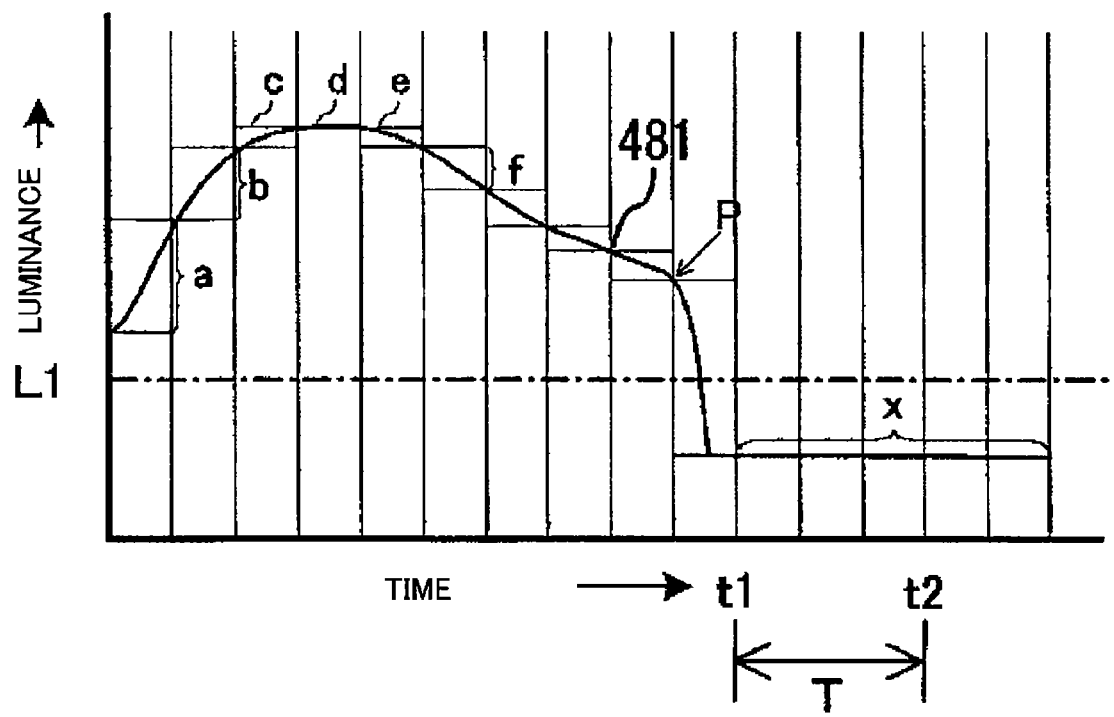
FIG. 16 shows an example of the change of a light-receiving luminance level in an external ranging sensor unit in Embodiment 4.

In FIG. 16, reference numeral 481 shows an example of the change over time of the light-receiving luminance level in the external ranging sensor unit 141. The light-receiving luminance level 481 (represented by the vertical axis) changes with time represented by the horizontal axis due to movements of an object, camera shake, and the like.

Each of the luminance levels shown as "a", "b", "c", "d", "e" and "f", . . . in FIG. 16 represents a change amount of luminance per unit time. The change amount of luminance per unit time can be provided, for example, by sampling the light-receiving luminance level in the external ranging sensor unit 141 (line sensors 341 and 342) in the read-out cycle of an image-pickup signal and acquiring the difference between the previous sampling value and the current sampling value.

In FIG. 16, the luminance is changed at a time "P" when the front of the external ranging sensor unit 141 is covered with an obstruction such as a hand of a user. The obstruction which covers the external ranging sensor unit 141 prevents the light from the object from entering the external ranging sensor unit 141, resulting in a sharp reduction in the light-receiving luminance level to below the predetermined luminance level "L1". After the light-receiving luminance level is reduced to below the predetermined luminance level "L1", it is hardly changed as shown by "x".

The sampling time immediately after the light-receiving luminance level is reduced to below the predetermined luminance level L1 is shown as "t1". If the light-receiving luminance level remains below the predetermined level L1 at a sampling time "t2" after the lapse of a predetermined time period "T" from the time "t1", the flow proceeds to S709 from S705 in FIG. 13.

If the obstruction covering the external ranging sensor unit 141 is removed before the lapse of the predetermined time period "T" to return the light-receiving luminance level to above the predetermined luminance level "L1", the flow proceeds to S706.

The predetermined time period T is appropriately set on the basis of the maximum time period taken for focus control in which an in-focus state is achieved after an out-of-focus state when the external ranging sensor unit 141 is not covered with any obstruction, for example.

As described above, in Embodiment 4, it is determined whether or not the external ranging AF with the object distance information provided by the external ranging sensor unit 141 should be performed depending on whether or not the state in which the light-receiving luminance levels in the external ranging sensor unit 141 are lower than the predetermined luminance level continues for the predetermined time period or longer. If the state continues for the predetermined time period or longer, the TV-AF is performed. Thus, when an obstruction such as a hand of a user is present on the optical path between the external ranging sensor unit 141 and the object, the external ranging AF can be prevented from being performed on the basis of the incorrect object distance information, and at the same time, the correct in-focus state can be achieved with the TV-AF.

In addition, according to Embodiment 4, it is determined whether or not the external ranging AF should be performed depending on the light-receiving luminance levels in both of the paired line sensors 341 and 342, so that the abovementioned effects can be attained even when both of the optical paths from the object to the line sensors 341 and 342 are blocked.

Embodiment 5

Figure 14:
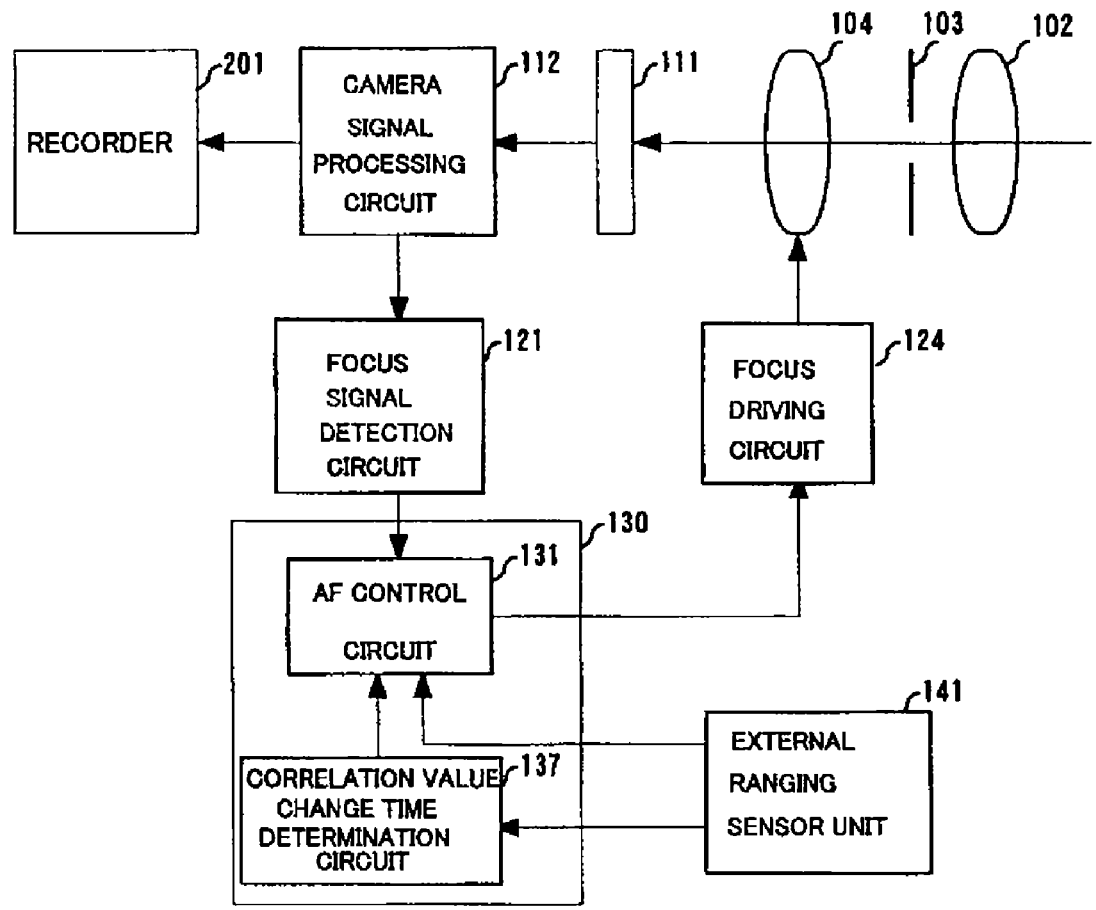
FIG. 14 is a block diagram showing the configuration of a video camera which is Embodiment 5 of the present invention.

FIG. 14 shows the configuration of a video camera which is Embodiment 5 of the present invention. In Embodiment 5, components identical to those in Embodiments 1 to 4 are designated with the same reference numerals as those in Embodiments 1 to 4.

In Embodiment 4, it is determined whether or not the external ranging AF should be performed on the basis of the light-receiving luminance levels in the external ranging sensor unit 141. In contrast, in Embodiment 5, it is determined whether or not the external ranging AF should be performed on the basis of a correlation value of outputs from a pair of line sensors 341 and 342.

The calculation of the correlation value (uncorrelated value) in an external ranging sensor unit 141 and the calculation of an object distance are as described in Embodiments 1 and 2. Specifically, two image signals read out from the line sensors 341 and 342 shown in FIG. 9 and accumulated on line memories 351 and 352 are then input to a correlation calculation circuit 361 which in turn calculates the uncorrelated value of the two image signals. An object distance calculation circuit 362 calculates the object distance based on the shift amount between the pixels having the lowest uncorrelated value (the highest correlation value) found from the comparison of the light amount, of the pixels on the line sensors 341 and 342.

In FIG. 14, reference numeral 137 shows a correlation value change time determination circuit which determines whether or not the correlation value of two image signals read out from the paired line sensors 341 and 342 is lower than a predetermined value (first value).

The correlation value change time determination circuit 137 also determines whether or not a state in which the correlation value is lower than the predetermined value continues for a predetermined time period (first time period) or longer. The predetermined value and the predetermined time period are previously stored in memory, not shown, in a microcomputer 130. The correlation value change time determination circuit 137 transmits the determination results to an AF control circuit 131 in the microcomputer 130.

The correlation value is as described in Embodiment 2 with reference to FIG. 11.

Figure 15:
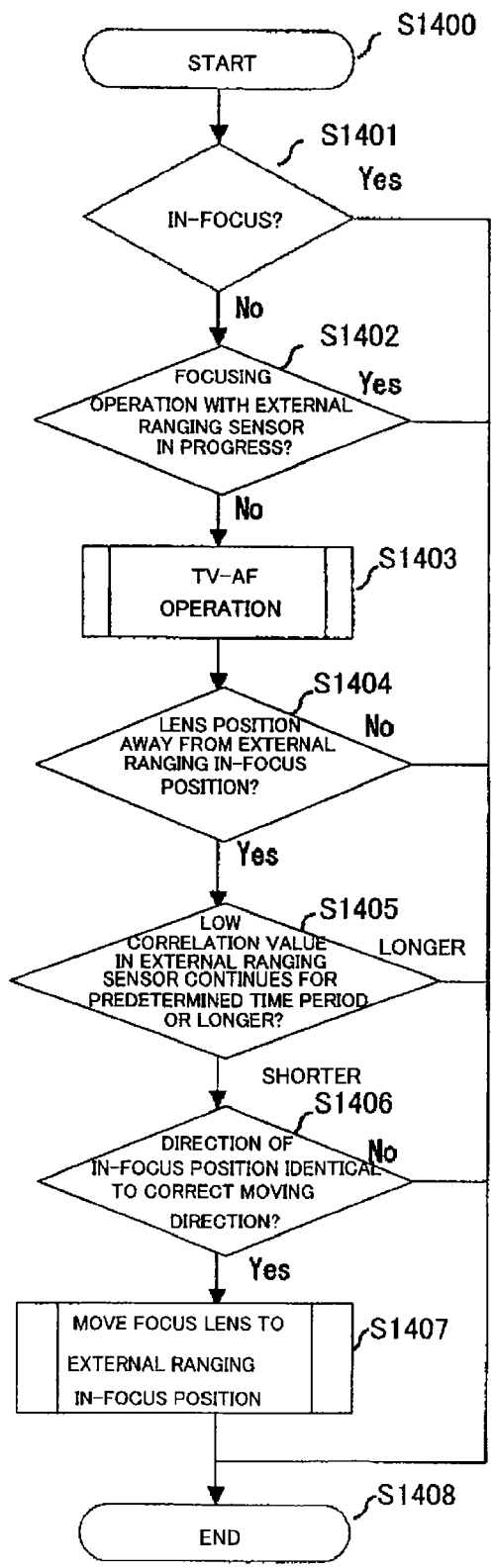
FIG. 15 is a flow chart showing the procedure of AF control in Embodiment 5.

Next, description will be made of AF control performed by the microcomputer 130 including the AF control circuit 131 with reference to the flow chart in FIG. 15.

At S1400, the microcomputer 130 starts the AF control. The processing shown in the flow chart is performed in a read-out cycle of an image-pickup signal from an image-pickup element 111 for producing an image of one field, for example.

At S1401, the microcomputer 130 determines whether or not an in-focus state is achieved. If it is determined that the in-focus state is achieved, the flow proceeds to S1408, or to S1402 if it is determined that the in-focus state is not achieved. The determination of the in-focus state can be performed through in-focus determination in TV-AF operation.

At S1402, the microcomputer 130 determines whether or not a focus lens 104 is in the process of focusing operation with the external ranging AF. If the focusing operation is being performed, the flow proceeds to S1408, or to S1403 if the focusing operation is not being performed.

At S1403, the microcomputer 130 performs the TV-AF operation shown in the flow chart of FIG. 8.

At S1404, the microcomputer 130 uses the object distance information provided by the external ranging sensor unit 141 to calculate the external ranging in-focus position of the focus lens 104 where the in-focus state can be achieved for that object distance. The microcomputer 130 compares the external ranging in-focus position with the current position of the focus lens 104 and determines whether or not the current position of the focus lens 104 is away from the external ranging in-focus position. When the focus lens 104 is placed outside a predetermined range including the external ranging in-focus position, the flow proceeds to S1405. When the focus lens 104 is placed within the predetermined range including the external ranging in-focus position, the flow proceeds to S1408.

At S1405, the microcomputer 130 determines whether or not the correlation value of the image signals in the line sensors 341 and 342 provided by the external ranging sensor unit 141 is lower than the predetermined value.

In addition, when it is determined that the correlation value is lower than the predetermined value at S1405, the microcomputer 130 determines whether or not a state in which the correlation value is lower than the predetermined value continues for the predetermined time period or longer. If the state continues for the predetermined time period or longer, the flow proceeds to S1408, or to S1406 if not.

At S1406, the microcomputer 130 determines whether or not the direction of the external ranging in-focus position relative to the focus lens 104 is the same as the correct moving direction of the focus lens 104 determined in the TV-AF processing (S1005 in FIG. 8) at S1403. If they are the same, the microcomputer 130 determines that the external ranging in-focus position (or the object distance information) is correct and the flow proceeds to S1407, or to S1408 if they are not the same.

At S1407, the microcomputer 130 moves the focus lens 104 to the external ranging in-focus position. In other words, the external ranging AF is performed.

At S1408, the microcomputer 130 ends the processing of the AF control.

As described above, in Embodiment 5, it is determined whether or not the external ranging AF with the object distance information provided by the external ranging sensor unit 141 should be performed depending on whether or not a state in which the correlation value of the image signals provided by the external ranging sensor unit 141 is lower than the predetermined value continues for the predetermined time period or longer. If the state continues for the predetermined time period or longer, the TV-AF is performed. Thus, when an obstruction such as a hand of a user is present on the optical path between the external ranging sensor unit 141 and the object, the external ranging AF can be prevented from being performed on the basis of the incorrect object distance information, and at the same time, the correct in-focus state can be achieved with the TV-AF.

According to Embodiments 4 and 5, when the state of the low light-receiving luminance level or the low correlation value in the second detector continues for the predetermined time period or longer to indicate that the second information is likely to be incorrect, focus control is performed with the first information without performing focus control with the second information. Therefore, the focus control based on the incorrect second information can be prevented from being performed and the correct in-focus state can be achieved.

Embodiment 6

Figure 17:
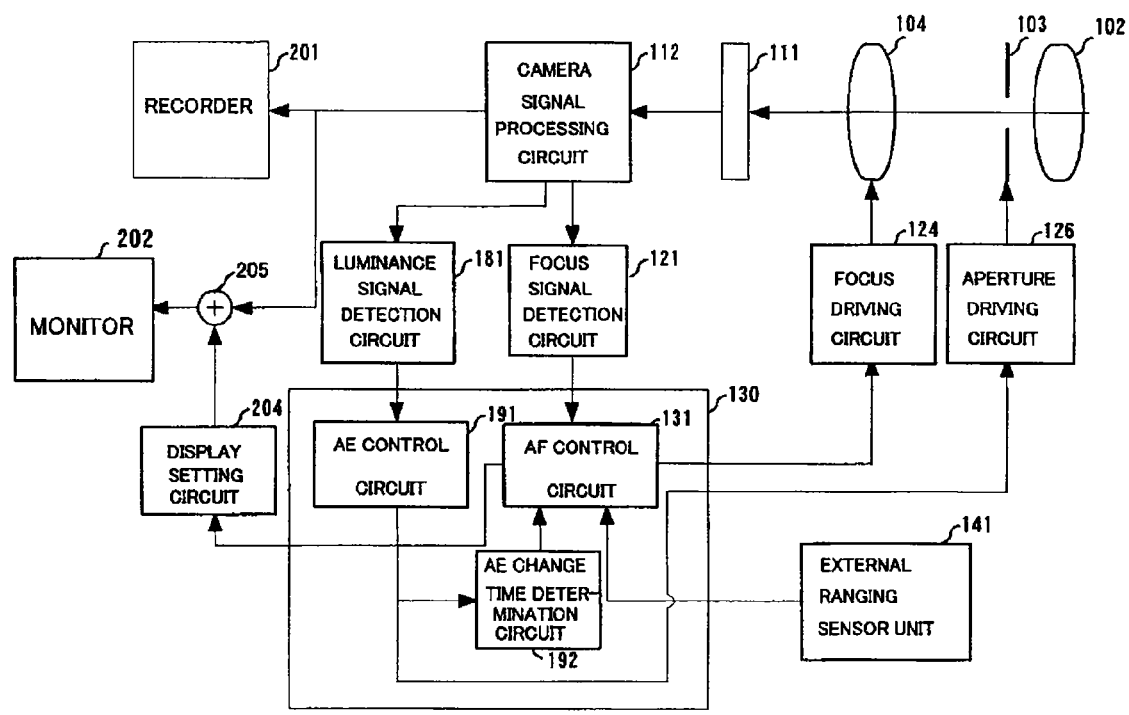
FIG. 17 is a block diagram showing the configuration of a video camera which is Embodiment 6 of the present invention.

FIG. 17 shows the configuration of a video camera (image-pickup apparatus) which is Embodiment 6 of the present invention. In FIG. 17, components identical to those in Embodiments 1 to 5 are designated with the same reference numerals as those in Embodiments 1 to 5.

In FIG. 17, a luminance signal detection circuit 181 detects and integrates a luminance component included in a luminance signal component of a video signal output from a camera signal processing circuit 112. The result thereof is input to an AE control circuit 191 in a microcomputer 130.

Next, autoexposure (AE) operation will be described. The detected luminance signal provided by the luminance signal detection circuit 181 is compared with a predetermined brightness level (predetermined exposure level) representing proper exposure in the AE control circuit 191. The AE control circuit 191 provides an aperture control signal indicating the difference between them for an aperture driving circuit 126 which in turn drives an aperture stop 103 in accordance with the aperture control signal. This changes the diameter of the aperture formed by a plurality of aperture blades (not shown) in the aperture stop 103 to adjust the amount of light which enters an image-pickup element 111.

When the luminance level of the detected luminance signal is higher than the predetermined exposure level, that is, when the object luminance is high, the AE control circuit 191 outputs the aperture control signal for driving the aperture stop 103 to reduce the aperture diameter. This reduces the amount of light entering the image-pickup element 111. On the other hand, when the luminance level of the detected luminance signal is lower than the predetermined exposure level, that is, when the object luminance is low, the AE control circuit 191 outputs the aperture control signal for driving the aperture stop 103 to increase the aperture diameter. This increases the amount of light entering the image-pickup element 111.

When the luminance level of the detected luminance signal reaches the predetermined exposure level (in reality, when it falls within a certain range based on the predetermined exposure level), the control for the aperture stop 103 is stabilized with that aperture diameter to maintain the proper exposure.

The aperture control signal provided by the AE control circuit 191 is also input to an AE change determination circuit 192. The AE change determination circuit 192 determines whether or not the aperture control signal input thereto has been changed by a predetermined amount or more and outputs the determination result to an AF control circuit 131. The predetermined amount is set to a value corresponding to the proper number of aperture steps to prevent frequent switching between the TV-AF and the external ranging AF. The AF control circuit 131 also detects the aperture diameter (aperture value) indicated by the aperture control signal via the AE change determination circuit 192.

The AF control circuit 131 switches between the TV-AF and the external ranging AF in accordance with the determination result from the AE change determination circuit 192 and the aperture value. The AF control circuit 131 and the AE change determination circuit 192 constitute a focus controller.

The AF control circuit 131 also has the function of detecting the levels of luminance components of image signals (information on a light-receiving state, hereinafter referred to as a light-receiving luminance level) output from line sensors 341 and 342 of an external ranging sensor unit 141.

Figure 18:
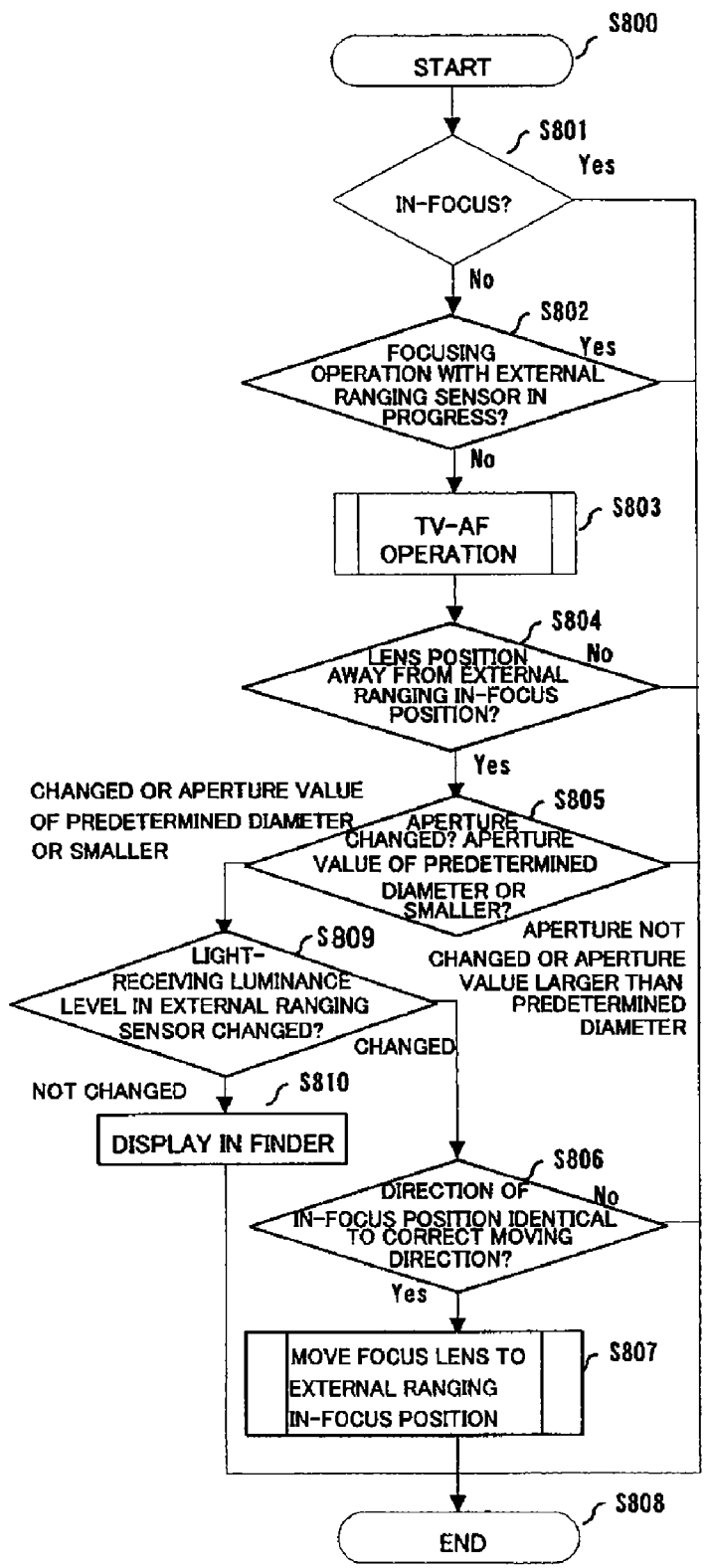
FIG. 18 is a flow chart showing the procedure of AF control in Embodiment 6.

Next, description will be made of AF control performed by the microcomputer 130 including the AF control circuit 131 with reference to the flow chart in FIG. 18.

The general flow of the AF control will be described first with reference to FIG. 18.

At S800, the microcomputer 130 starts the AF control. The processing shown in the flow chart is performed in a read-out cycle of an image-pickup signal from the image-pickup element 111 for producing an image of one field, for example.

At S801, the microcomputer 130 determines whether or not an in-focus state is achieved. If it is determined that the in-focus state is achieved, the flow proceeds to S808, or to S802 if it is determined that the in-focus state is not achieved. The determination of the in-focus state can be performed through in-focus determination in TV-AF operation.

At S802, the microcomputer 130 determines whether or not a focus lens 104 is in the process of focusing operation with the external ranging AF. If the focusing operation is being performed, the flow proceeds to S808, or to S803 if the focusing operation is not being performed.

At S803, the microcomputer 130 performs the TV-AF operation shown in the flow chart of FIG. 8.

At S804, the microcomputer 130 uses the object distance information provided by the external ranging sensor unit 141 to calculate the position of the focus lens 104 (hereinafter referred to as the external ranging in-focus position) where the in-focus state can be achieved for that object distance. The microcomputer 130 compares the external ranging in-focus position with the current position of the focus lens 104 detected by a lens position detector, not shown, and determines whether or not the current position of the focus lens 104 is away from the external ranging in-focus position. When the focus lens 104 is placed outside a predetermined range including the external ranging in-focus position, the flow proceeds to S805. When the focus lens 104 is placed within the predetermined range including the external ranging in-focus position, the flow proceeds to S808.

At S805, the microcomputer 130 determines whether or not the determination result from the AE change determination circuit 192 indicates that the aperture control signal has been changed by the predetermined amount or more (that is, the control state of the aperture stop 103 has been changed). The microcomputer 130 also determines whether or not the aperture value indicated by the aperture control signal corresponds to a predetermined aperture diameter or smaller. When the aperture control signal has been changed by the predetermined amount or more or when the aperture control signal indicates the predetermined aperture diameter or smaller, the flow proceeds to S809, or to S808 if not.

The predetermined aperture diameter refers to an aperture diameter smaller than the full aperture diameter, for example. The predetermined aperture diameter may be the full aperture diameter. In this case, when the aperture stop 103 is fully opened and the aperture control signal for increasing the diameter of the aperture stop 103 is output, the aperture control signal does not indicate an aperture diameter equal to or smaller than the predetermined aperture diameter and the flow proceeds to S808. The aperture stop 103 is controlled to the predetermined aperture diameter or smaller to achieve proper exposure.

At S809, the microcomputer 130 determines whether or not the light-receiving luminance level in the external ranging sensor unit 141 is changed in accordance with a change in the aperture control signal. Next, the change in the light-receiving luminance level will be described with reference to FIG. 19.

Figure 19:
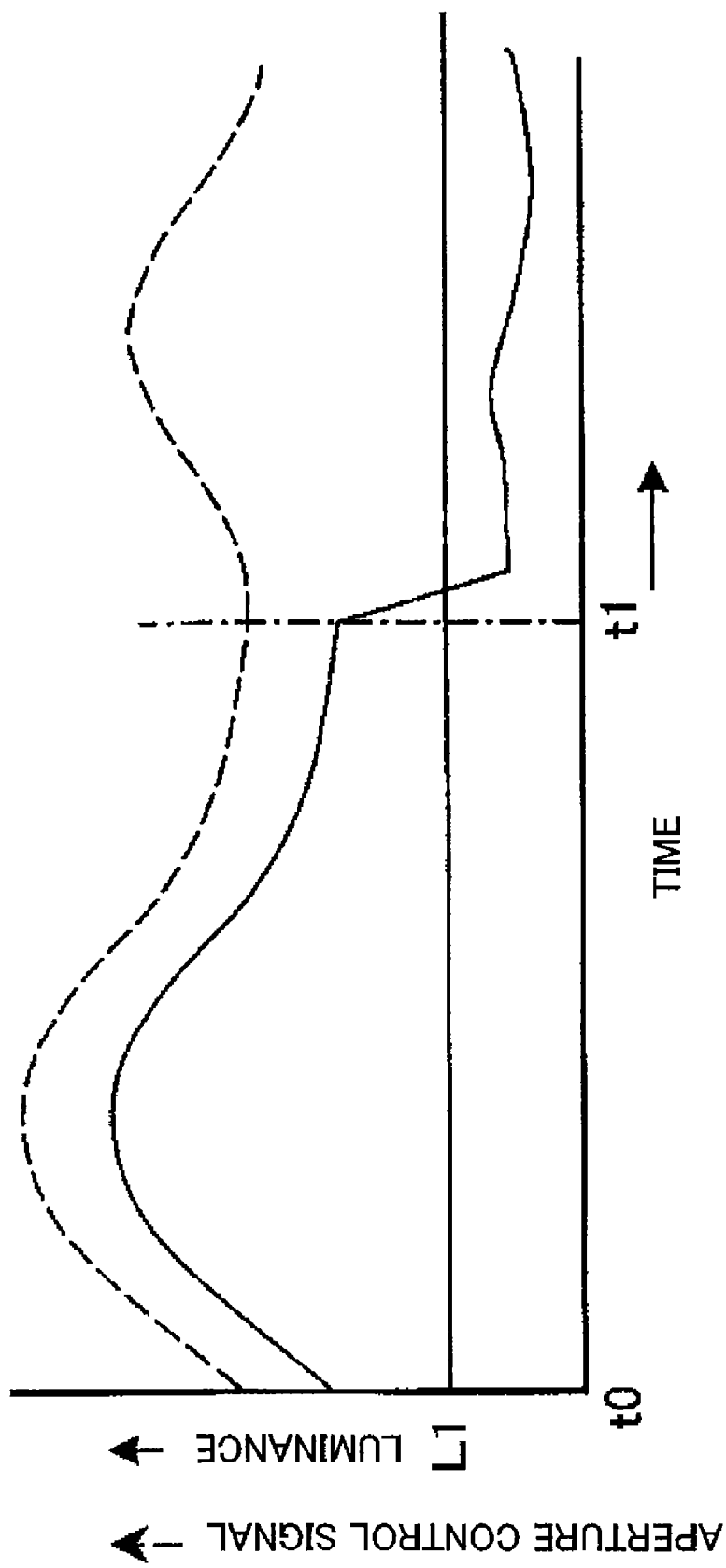
FIG. 19 shows a graph showing a relationship between an aperture control signal and a light-receiving luminance level in an external ranging sensor unit in Embodiment 6.

In FIG. 19, a dotted line represents an example of the change in the aperture control signal (aperture diameter). On the other hand, a solid line represents an example of the change in the light-receiving luminance level in the external ranging sensor unit 141. From times "t0" to "t1", the light-receiving luminance level in the external ranging sensor unit 141 is changed to follow the change in the aperture control signal. This shows that an object whose image is picked up by the image-pickup element 111 is present in a detection view field of the external ranging sensor unit 141.

After the time "t1", however, the light-receiving luminance level in the external ranging sensor unit 141 is reduced to below "L1" and is hardly changed. In other words, the light-receiving luminance level in the external ranging sensor unit 141 is not changed in accordance with the change in the aperture control signal. This means that the front of the external ranging sensor unit 141 is covered with an obstruction such as a hand of a user at the time "t1".

When the light-receiving luminance level in the external ranging sensor unit 141 is changed to follow the change in the aperture control signal, it is determined that the proper light-receiving state for providing the correct object distance information is achieved and the flow proceeds to S806. When the light-receiving luminance level is not changed in accordance with the change in the aperture control signal, it is determined that the proper light-receiving state for providing the correct object distance information is not achieved and the flow proceeds to S810.

At S806, the microcomputer 130 determines whether or not the direction of the in-focus position (hereinafter referred to as the external ranging in-focus position) calculated from the object distance information provided by the external ranging sensor unit 141 is the same as the correct moving direction determined in the TV-AF processing (S1005 in FIG. 8) at S803. If they are the same, the microcomputer 130 determines that the detection result of the object distance by the external ranging sensor is correct and the flow proceeds to S807, or to S808 if they are not the same.

At S807, the microcomputer 130 moves the focus lens 104 to the external ranging in-focus position. In other words, the external ranging AF is performed.

At S810, the microcomputer 130 causes a display setting circuit 204 to display characters on a monitor 204, for example with letters "information from distance sensor not used" or graphics representing that fact.

At S808, the microcomputer 130 ends the processing of the AF control.

As described above, in Embodiment 6, the change in the object present within the detection view field of the external ranging sensor unit 141 is detected with reference to the control state of the aperture stop 103. It is determined that an obstruction is present between the external ranging sensor unit 141 and the object by detecting that the light-receiving luminance level associated with the light-receiving state of the external ranging sensor unit 141 is not changed in accordance with the change in the object. In this case, the external ranging AF can be limited to avoid erroneous focus control, and accurate focus control can be performed with the TV-AF. As a result, smooth focus control can be realized.

Embodiment 6 has been described for the case where it is determined whether or not the light-receiving luminance level in the external ranging sensor unit 141 is changed to follow the change in the control state of the aperture stop 103. However, it is possible to determine whether or not a correlation value provided in the external ranging sensor unit 141 is changed to follow a change in the control state of the aperture stop 103 as described later in Embodiment 7.

Embodiment 7

Figure 20:
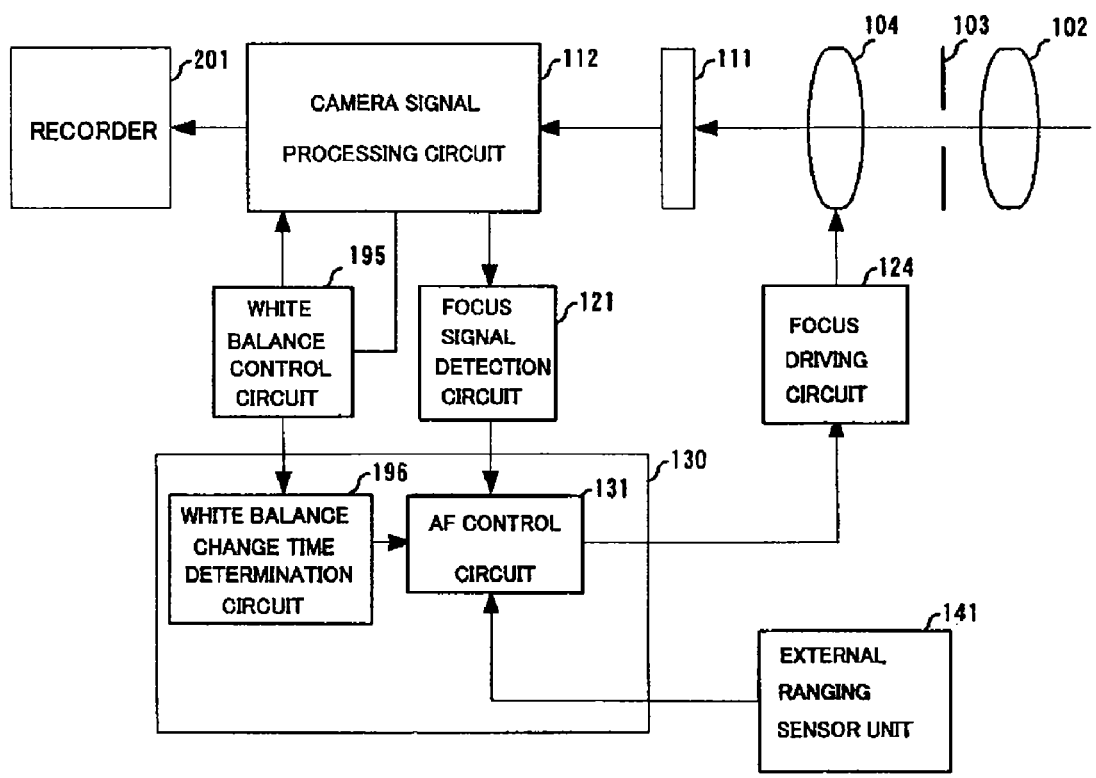
FIG. 20 is a block diagram showing the configuration of a video camera which is Embodiment 7 of the present invention.

FIG. 20 shows the configuration of a video camera which is Embodiment 7 of the present invention. In Embodiment 7, components identical to those in Embodiments 1 to 6 are designated with the same reference numerals as those in Embodiments 1 to 6.

In Embodiment 7, it is determined whether or not the external ranging AF should be limited depending on whether or not information on a light-receiving state of an external ranging sensor unit 141 is changed in accordance with a change in a control state of auto-white balance (AWB). A correlation value provided by the external ranging sensor unit 141 is used as the information on the light-receiving state of the external ranging sensor unit 141.

In FIG. 20, reference numeral 195 shows a white balance control circuit which controls white balance (color balance) in a camera signal processing circuit 112. Specifically, the white balance control circuit 195 controls the gain of each color signal such that the total sum of color signals of R, G, and B included in a video signal input thereto from the camera signal processing circuit 112 represents white.

Reference numeral 196 shows a white balance change determination circuit provided in a microcomputer 130. The white balance change determination circuit 196 determines whether or not the gain of each color signal (that is, the control state of the white balance) controlled by the white balance control circuit 195 has been changed by a predetermined amount or more. The predetermined amount is set to a value corresponding to a gain range appropriate for preventing frequent switching between the TV-AF and the external ranging AF.

The calculation of the correlation value (uncorrelated value) in the external ranging sensor unit 141 and the calculation of an object distance are as described in Embodiments 1 and 2. Specifically, two image signals read out from line sensors 341 and 342 shown in FIG. 9 and accumulated on line memories 351 and 352 are input to a correlation calculation circuit 361 which in turn calculates the uncorrelated value in the two image signals. The object distance is calculated on the basis of the shift amount between the pixels having the lowest uncorrelated value (the highest correlation value) found from the comparison of the light amount, of the pixels on the line sensors 341 and 342.

The correlation value is as described in Embodiment 2 with reference to FIG. 11.

The correlation value (highest correlation value) is changed in accordance with a change in the control state of the white balance when an object whose image is picked up by the video camera is present in a detection view field of the external ranging sensor unit 141.

The correlation value, however, is not changed in accordance with a change in the control state of the white balance when an obstruction is present between the external ranging sensor unit 141 and the object. This fact is used to determine the presence of an obstruction in Embodiment 7.

Figure 21:
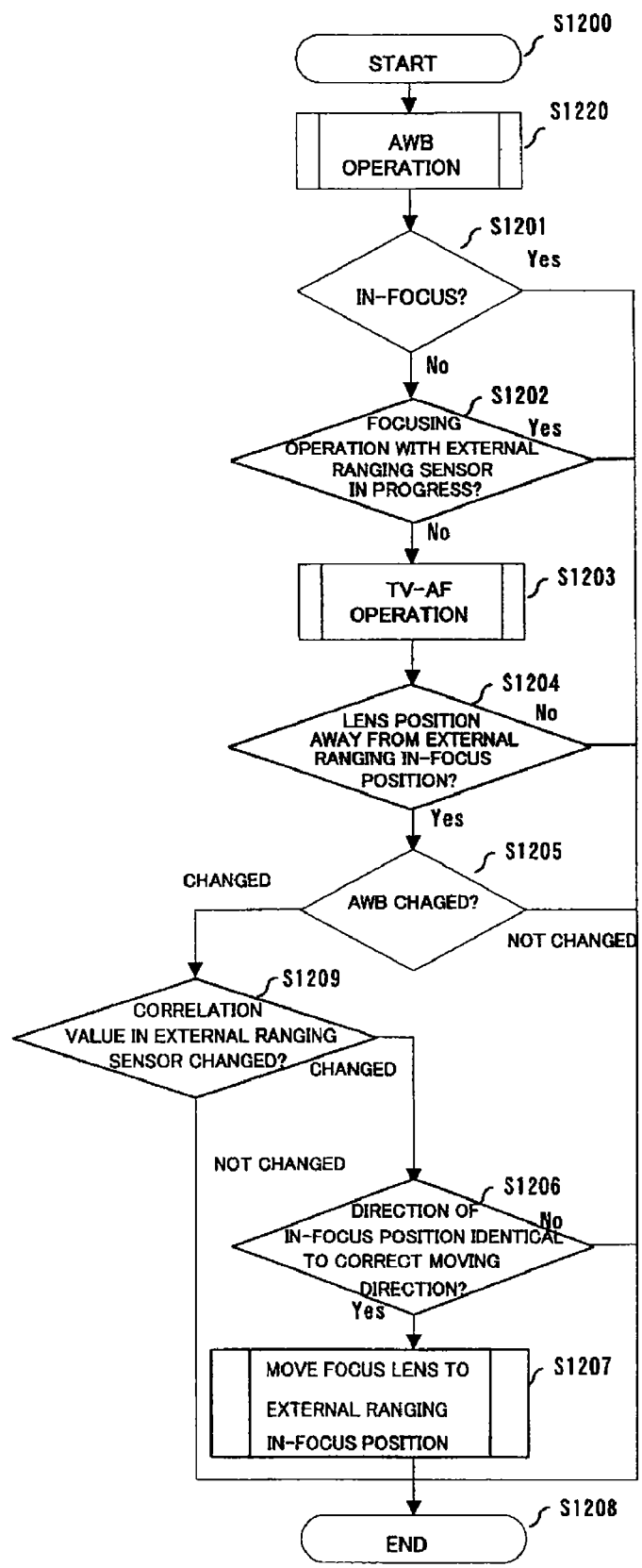
FIG. 21 is a flow chart showing the procedure of AF control in Embodiment 7.

Next, description will be made of AF control performed by the microcomputer 130 including the AF control circuit 131 with reference to the flow chart in FIG. 21.

At S1200, the microcomputer 130 starts the AF control. The processing shown in the flow chart is performed in a read-out cycle of an image-pickup signal from an image-pickup element 111 for producing an image of one field, for example.

At S1220, the microcomputer 130 causes the white balance control circuit 195 to perform white balance control.

At S1201, the microcomputer 130 determines whether or not an in-focus state is achieved. If it is determined that the in-focus state is achieved, the flow proceeds to S1208, or to S1202 if it is determined that the in-focus state is not achieved. The determination of the in-focus state can be performed through in-focus determination in TV-AF operation.

At S1202, the microcomputer 130 determines whether or not a focus lens 104 is in the process of focusing operation with the external ranging AF. If the focusing operation is being performed, the flow proceeds to S1208, or to S1203 if the focusing operation is not being performed.

At S1203, the microcomputer 130 performs the TV-AF operation shown in the flow chart of FIG. 8.

At S1204, the microcomputer 130 compares the current position of the focus lens 104 with the in-focus position calculated on the basis of the object distance information provided by the external ranging sensor unit 141, and determines whether or not the difference between them is larger than a predetermined value. If the difference is larger than the predetermined value, the microcomputer 130 determines that the focus lens 104 is away from the in-focus position and the flow proceeds to S1205. If the difference is equal to or lower than the predetermined value, the microcomputer 130 determines that the focus lens 104 is located at the in-focus position and the flow proceeds to S1208.

At S1205, the microcomputer 130 uses the determination result in the white balance change determination circuit 196 to determine whether or not the white balance control state has been changed. If the white balance control state has been changed, the flow proceeds to S1209, or to S1208 if the white balance control state has not been changed.

At S1209, the microcomputer 130 determines whether or not the correlation value provided by the external ranging sensor unit 141 is changed to follow the control state of the white balance. The correspondence between the correlation value and the white balance control state is similar to the correspondence between the aperture control signal and the light-receiving luminance level shown in FIG. 19.

When the correlation value is changed to follow the change in the white balance control state, it is determined that the proper light-receiving state for providing the correct object distance information is achieved in the external ranging sensor unit 141 and the flow proceeds to S1206. When the correlation value is not changed in accordance with the change in the white balance control state, it is determined that the proper light-receiving state for providing the correct object distance information is not achieved in the external ranging sensor unit 141 and the flow proceeds to S1208.

At S1206, the microcomputer 130 determines whether or not the direction of the external ranging in-focus position calculated from the object distance information provided by the external ranging sensor unit 141 is the same as the correct moving direction determined in the TV-AF processing (S1005 in FIG. 8) at S1203. If they are the same, the microcomputer 130 determines that the detection result of the object distance by the external ranging sensor is correct and the flow proceeds to S1207, or to S1208 if they are not the same.

At S1207, the microcomputer 130 moves the focus lens 104 to the external ranging in-focus position. This can achieve an in-focus state or an approximately in-focus state with the external ranging AF.

At S1208, the microcomputer 130 ends the flow.

As described above, in Embodiment 7, the change in the object present within the detection view field of the external ranging sensor unit 141 is detected with reference to the control state of the white balance. It is determined that an obstruction is present between the external ranging sensor unit 141 and the object by detecting that the correlation value associated with the light-receiving state of the external ranging sensor unit 141 is not changed in accordance with a change in the object. In this case, the external ranging AF can be limited to avoid erroneous focus control, and accurate focus control can be performed with the TV-AF. As a result, smooth focus control can be realized.

When the control state of the white balance has not been changed, that is, when the object or the object image (image-pickup video) has not been changed, the external ranging AF is limited and the TV-AF is performed. Thus, smooth focus control can be performed in a situation other than the case where an obstruction is present as described above.

Embodiment 7 has been described for the case where it is determined whether or not the correlation value provided in the external ranging sensor unit 141 is changed to follow the change in the control state of the white balance. However, it is possible to determine whether or not the light-receiving luminance level in the external ranging sensor unit 141 is changed to follow a change in the control state of the white balance as described in Embodiment 6.

Embodiment 8

Figure 22:
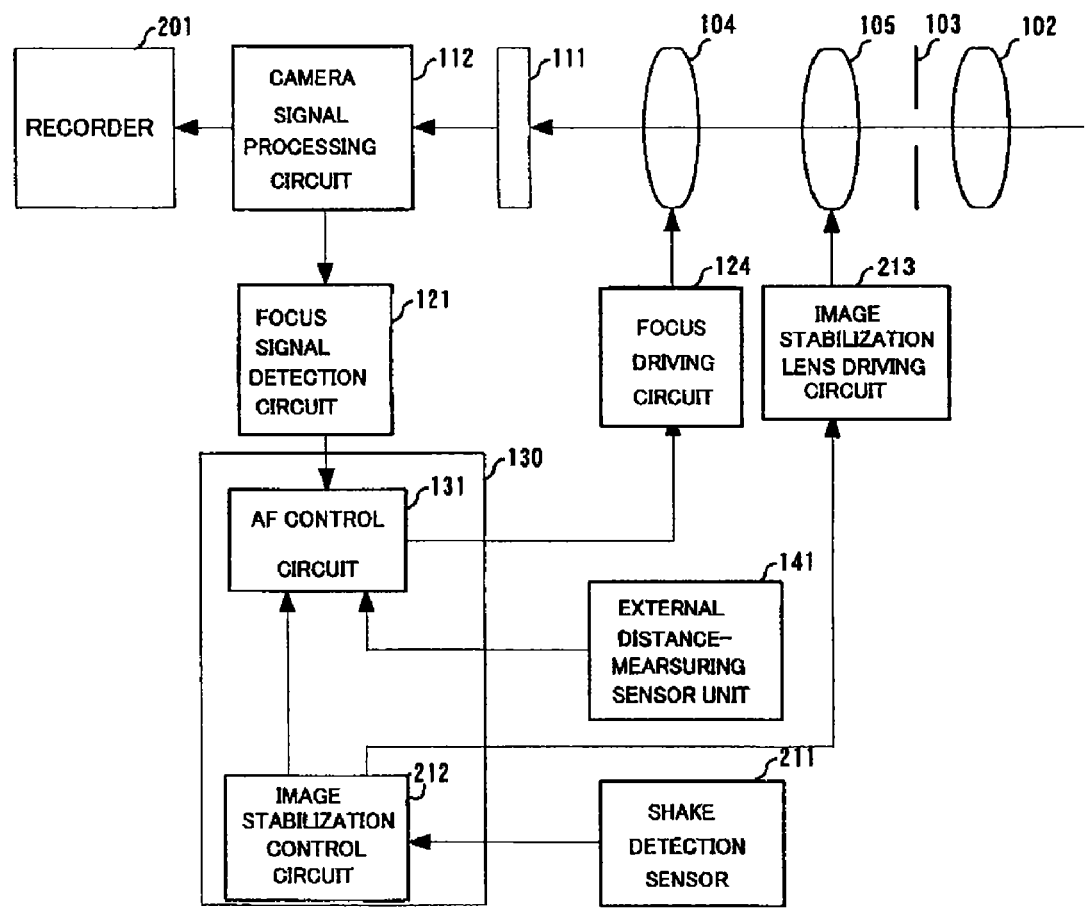
FIG. 22 is a block diagram showing the configuration of a video camera which is Embodiment 8 of the present invention.

FIG. 22 shows the configuration of a video camera which is Embodiment 8 of the present invention. In Embodiment 8, components identical to those in Embodiments 1 to 7 are designated with the same reference numerals as those in Embodiments 1 to 7.

In Embodiment 8, it is determined whether or not the external ranging AF should be limited depending on whether or not information on a light-receiving state of an external ranging sensor unit 141 is changed in accordance with a change in the detection state of camera movement (that is, camera shake) due to hand jiggling of a user, for example. As in Embodiment 7, a correlation value provided by the external ranging sensor unit 141 is used as the information on the light-receiving state of the external ranging sensor unit 141.

In FIG. 22, reference numeral 211 shows a shake detection sensor which detects camera shake and is formed of an angular velocity sensor, an angular acceleration sensor or the like. The camera shake may be detected by calculating a motion vector in a video signal, instead of using the shake detection sensor 211.

Reference numeral 105 shows an image stabilization lens which is moved in a direction orthogonal to an optical axis in an image-pickup optical system to move the position of an image on an image-pickup element 111. In addition to this type, it is possible to use a lens which rotates about a particular position on the optical axis or a so-called variable-angle prism as the image stabilization lens 105.

Reference numeral 212 shows an image stabilization control circuit which is provided in a microcomputer 130 and controls the driving of the image stabilization lens 105 through an image stabilization lens driving circuit 213 based on the output from the shake detection sensor 211. Specifically, the image stabilization control circuit 212 integrates a shake signal (for example, angular velocity signal) from the shake detection sensor 211 to calculate the amount and direction of the camera shake. The image stabilization control circuit 212 determines the amount and direction of driving of the image stabilization lens 105 necessary for canceling out the displacement of an object image due to the camera shake and outputs an image stabilization signal representing the driving amount and direction to the image stabilization lens driving circuit 213.

In response to the signal, the image stabilization lens 105 is driven, for example in a direction orthogonal to the optical axis, to reduce image shake.

The image stabilization control circuit 212 also transmits the presence or absence of the camera shake detected by the shake detection sensor 211 to an AF control circuit 131.

When an object whose image is picked up by the video camera is present in the detection view field of the external ranging sensor unit 141, the correlation value (highest correlation value) in the external ranging sensor unit 141 is changed in accordance with a relative shake between the detection view field and the object, that is, a change in the shake detection state of the shake detection sensor 211.

The correlation value, however, is not changed in accordance with a change in the shake detection state of the shake when an obstruction is present between the external ranging sensor unit 141 and the object. This fact is used to determine the presence of an obstruction in Embodiment 8.

Figure 23:
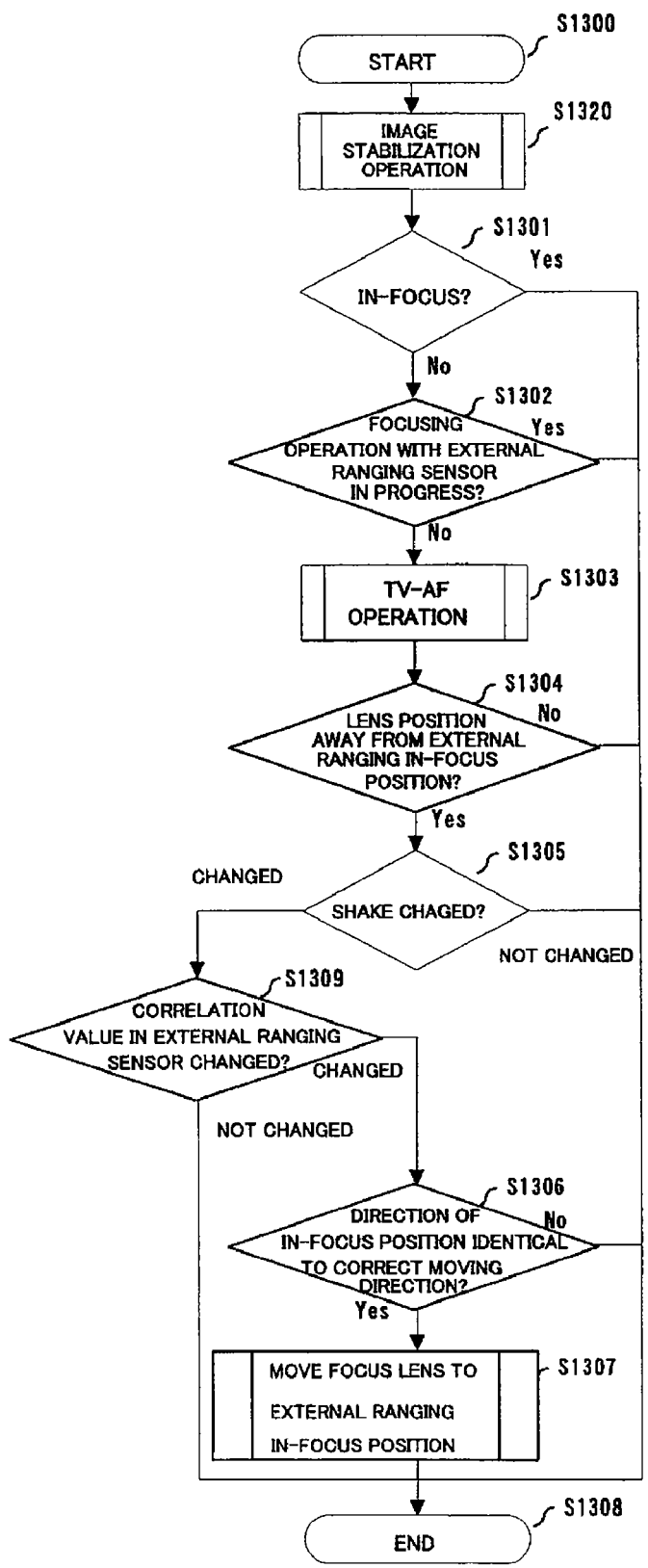
FIG. 23 is a flow chart showing the procedure of AF control in Embodiment 8.

Next, description will be made of AF control performed by the microcomputer 130 including the AF control circuit 131 with reference to the flow chart in FIG. 23.

At S1300, the microcomputer 130 starts the AF control. The processing shown in the flow chart is performed in a read-out cycle of an image-pickup signal from the image-pickup element 111 for producing an image of one field, for example.

At S1320, the microcomputer 130 starts up the shake detection sensor 211 and causes the image stabilization control circuit 212 to control the driving of the image stabilization lens 105.

At S1301, the microcomputer 130 determines whether or not an in-focus state is achieved. If it is determined that the in-focus state is achieved, the flow proceeds to S1308, or to S1302 if it is determined that the in-focus state is not achieved. The determination of the in-focus state can be performed through in-focus determination in TV-AF operation.

At S1302, the microcomputer 130 determines whether or not a focus lens 104 is in the process of focusing operation with the external ranging AF. If the focusing operation is being performed, the flow proceeds to S1308, or to S1303 if the focusing operation is not being performed.

At S1303, the microcomputer 130 performs the TV-AF operation shown in the flow chart of in FIG. 8.

At S1304, the microcomputer 130 compares the current position of the focus lens 104 with the in-focus position calculated on the basis of the object distance information provided by the external ranging sensor unit 141, and determines whether or not the difference between them is larger than a predetermined value. If the difference is larger than the predetermined value, the microcomputer 130 determines that the focus lens 104 is away from the in-focus position and the flow proceeds to S1305. If the difference is equal to or lower than the predetermined value, the microcomputer 130 determines that the focus lens 104 is located at the in-focus position and the flow proceeds to S1308.

At S1305, the microcomputer 130 determines whether or not camera shake is occurring based on the output from the shake detection sensor 211. If any camera shake is occurring (that is, if the shake detection state has been changed), the flow proceeds to S1309, or to S1308 if camera shake is not occurring. The determination of whether or not camera shake is occurring may be made by determining whether or not the output from the shake detection sensor 211 has been changed by a predetermined amount or more in order to prevent frequent switching between the TV-AF and the external ranging AF.

At S1309, the microcomputer 130 determines whether or not the correlation value provided by the external ranging sensor unit 141 is changed to follow the shake detection state. The correspondence between the correlation value and the shake detection state is similar to that between the aperture control signal and the light-receiving luminance level shown in FIG. 19.

When the correlation value is changed to follow the change in the shake detection state, it is determined that the proper light-receiving state for providing the correct object distance information is achieved in the external ranging sensor unit 141 and the flow proceeds to S1306. When the correlation value is not changed in accordance with the change in the shake detection state, it is determined that the proper light-receiving state for providing the correct object distance information is not achieved in the external ranging sensor unit 141 and the flow proceeds to S1308.

At S1306, the microcomputer 130 determines whether or not the direction of the external ranging in-focus position calculated from the object distance information provided by the external ranging sensor unit 141 is the same as the correct moving direction determined in the TV-AF processing (S1005 in FIG. 8) at S1303. If they are the same, it is determined that the detection result of the object distance by the external ranging sensor is correct and the flow proceeds to S1307, or to S1308 if they are not the same.

At S1307, the microcomputer 130 moves the focus lens 104 to the external ranging in-focus position. This can achieve an in-focus state or an approximately in-focus state with the external ranging AF.

At S1308, the microcomputer 130 ends the flow.

As described above, in Embodiment 8, the relative shake between the detection view field of the external ranging sensor unit 141 and the object is detected with reference to the shake detection state. It is determined that an obstruction is present between the external ranging sensor unit 141 and the object by detecting that the correlation value associated with the light-receiving state of the external ranging sensor unit 141 is not changed in accordance with the relative shake between the detection view field and the object. In this case, the external ranging AF can be limited to avoid erroneous focus control, and accurate focus control can be performed with the TV-AF. As a result, smooth focus control can be realized.

When camera shake is not present, that is, when the object image (image-pickup image) is not changed, the external ranging AF is limited and the TV-AF is performed. Thus, smooth focus control can be performed in a situation other than the case where an obstruction is present as described above.

Embodiment 8 has been described for the case where it is determined whether or not the correlation value provided in the external ranging sensor unit 141 is changed to follow the change in the shake detection state. However, it is possible to determine whether or not the light-receiving luminance level in the external ranging sensor unit 141 is changed to follow a change in the shake detection state as described in Embodiment 6.

According to Embodiments 6 to 8, when the light-receiving state of the second detector is not changed in response to the change in the control state of the aperture stop or the color balance, or the shake detection state, focus control based on the second information is limited. This can avoid erroneous focus control when correct second information cannot be provided, for example due to an obstruction present between the second detector and the object, thereby enabling to achieve a correct in-focus state.

Furthermore, the present invention is not limited to these preferred embodiments and various variations and modifications may be made without departing from the scope of the present invention.

This application claims foreign priority benefits based on Japanese Patent Applications Nos. 2006-201999, filed on Jul. 25, 2006, 2006-222209, filed on Aug. 17, 2006, and 2006-222210, filed on Aug. 17, 2006, and each of which is hereby incorporated by reference herein in its entirety as if fully set forth herein.

What is claimed is:

1. An image-pickup apparatus comprising:
    a first detector which produces first information corresponding to a contrast state of a picked-up image produced by using an image-pickup element;
    a second detector which receives light from an object to detect second information corresponding to a distance to the object;
    a focus controller which performs focus control by using the first information and the second information; and
    an aperture controller which controls an aperture stop for adjusting an amount of light entering the image-pickup element,
    wherein the focus controller performs the focus control by using the first information without using the second information when information on a light-receiving state of the second detector is not changed in accordance with a change in a control state of the aperture stop with the aperture controller.

2. A focus control method for an image-pickup apparatus, comprising:
    a step of acquiring first information corresponding to a contrast state of a picked-up image produced by using an image-pickup element;
    a step of acquiring second information corresponding to a distance to an object by using a detector which receives light from the object;
    a focus control step of performing focus control by using the first information and the second information; and
    an aperture control step of controlling an aperture stop for adjusting an amount of light entering the image-pickup element,
    wherein the focus control step includes performing the focus control by using the first information without using the second information when information on a light-receiving state of the detector is not changed in accordance with a change in a control state of the aperture stop in the aperture control step.

* * * * *